(12) United States Patent
Lu

(10) Patent No.: US 7,613,317 B2
(45) Date of Patent: Nov. 3, 2009

(54) IMAGE PROCESSING APPARATUS, IMAGE PROCESSING METHOD, COMPUTER PROGRAM AND COMPUTER READABLE STORAGE MEDIUM

(75) Inventor: Ling Lu, Kawasaki (JP)

(73) Assignee: Canon Kabushinki Kaisha, Tokyo (JP)

( * ) Notice: Subject to any disclaimer, the term of this patent is extended or adjusted under 35 U.S.C. 154(b) by 694 days.

(21) Appl. No.: 11/151,989

(22) Filed: Jun. 14, 2005

(65) Prior Publication Data
US 2006/0002584 A1    Jan. 5, 2006

(30) Foreign Application Priority Data
Jun. 30, 2004   (JP)  ............................. 2004-193482
Apr. 26, 2005   (JP)  ............................. 2005-127902

(51) Int. Cl.
    *G06K 9/00*     (2006.01)
(52) U.S. Cl. ..................... 382/100; 358/3.28
(58) Field of Classification Search ................ 382/100; 713/176; 283/113; 358/3.28
See application file for complete search history.

(56) References Cited

U.S. PATENT DOCUMENTS

| 5,363,212 | A | * | 11/1994 | Taniuchi et al. | ............. | 358/452 |
| 7,376,242 | B2 | * | 5/2008 | Bradley et al. | ............. | 382/100 |
| 2004/0181671 | A1 | * | 9/2004 | Brundage et al. | ........... | 713/176 |
| 2004/0223627 | A1 | * | 11/2004 | Shi et al. | .................... | 382/100 |

FOREIGN PATENT DOCUMENTS

CN     1404298 A     3/2003

\* cited by examiner

*Primary Examiner*—Matthew C Bella
*Assistant Examiner*—Dennis Rosario
(74) *Attorney, Agent, or Firm*—Canon U.S.A. Inc., I.P. Division

(57) ABSTRACT

There is provided a message processing apparatus including an image inputting unit for inputting a document image, an extracting unit for extracting a character image from the input document image, and an embedding unit for embedding watermark message by correcting a density value of the extracted character image.

6 Claims, 22 Drawing Sheets

IMAGE PROCESSING APPARATUS, IMAGE PROCESSING METHOD, COMPUTER PROGRAM AND COMPUTER READABLE STORAGE MEDIUM

BACKGROUND OF THE INVENTION

1. Field of the Invention

The present invention relates to the technology of embedding message on a document image, and extracting the embedded message.

2. Description of the Related Art

In recent years, in digital image forming devices, such as a printer and a copying machine, the improvement in the quality of images is remarkable, and high-definition printed matter can now easily be obtained. That is, anyone can obtain printed matter demanded by image processing by a highly efficient scanner, printer, copying machine, and computer. Therefore, problems, such as an illegal copy of a document and falsification, have occurred. In order to prevent or inhibit such illegal copies or falsification, access control message has been embedded as watermark message in the printed matter itself in recent years. The following processes have been proposed as general realization method for such watermarks:

(1) embedding message by controlling the quantity of space between words;

(2) embedding message by rotating a character;

(3) embedding message by scaling of character; and (4) embedding message by transforming a character.

FIG. 1 shows the printed matter of the type which embeds message by controlling the quantity of space between words, e.g., the quantity of space between English words. Here, s and p are called a space. This space will be set to $p1=(1+q)(p+s)/2$, and $s1=(1-q)(p+s)/2$, if an embedding watermark message bit is "0". It will be set to $p1=(1-q)(p+s)/2$, and $s1=(1+q)(p+s)/2$ if the embedding watermark message bit is "1". The range of q is $0<q<1$.

FIG. 2 illustrates a case in which watermark message is embedded by expanding or reducing a character size. For example, in cases where a character size is expanded rather than the original character, "1" is embedded (A in FIG. 2), and "0" is embedded in cases where the character size is reduced (B in FIG. 2). The character that is the embedded object may be a continuous character, a character of a prescribed interval, or a character of a prescribed position. In FIG. 2, since the character "m" is expanded and the character "u" is reduced, the watermark message "10" is embedded.

FIG. 3 is a figure illustrating a case in which watermark message is embedded by rotating a character (i.e., changing the lean of the character). For example, in cases where the character is rotated clockwise, "1" is embedded (C in FIG. 3), and "0" is embedded in cases where the character is rotated counterclockwise (D in FIG. 3). The character that is the embedded object may be a continuous character, a character of a prescribed interval, or a character of a prescribed position. In FIG. 3, since the character "m" is rotated clockwise and the character "t" is rotated counterclockwise, the message "10" is be embedded.

However, in cases where watermark message was embedded using the above-described conventional methods, a sense of incongruity is produced to the difference in a character size, the difference in the interval of a character, and the difference in the lean of a character.

SUMMARY OF THE INVENTION

In view of the above problems in the conventional art, the present invention provides a message processing apparatus which can minimize degradation of a font, secure the embedding of the amount of message more than fixed, and perform embedding and extracting of watermark message with high noise resistance.

In accordance with an aspect of the present invention, a message processing apparatus includes: an image inputting unit arranged to input a document image; an extracting unit arranged to extract a character image from the document image input by the image inputting unit; and an embedding unit arranged to embed watermark message by correcting a density value of the character image extracted by the extracting unit.

In accordance with another aspect of the present invention, a message processing apparatus includes: an inputting unit arranged to input a watermarked document image; an analyzing unit arranged to obtain a most frequent value of the character images in the document image input by the inputting unit; and an extracting unit arranged to extract the watermark message by comparing the most frequent value of the character images with a predetermined value.

Further features and advantages of the present invention will become apparent from the following description of exemplary embodiments (with reference to the accompanying drawings).

DESCRIPTION OF THE EMBODIMENTS

Exemplary embodiments of the watermark message embedding apparatus of the present invention are described below with reference to the accompanying drawings.

First Embodiment

Figure 1:
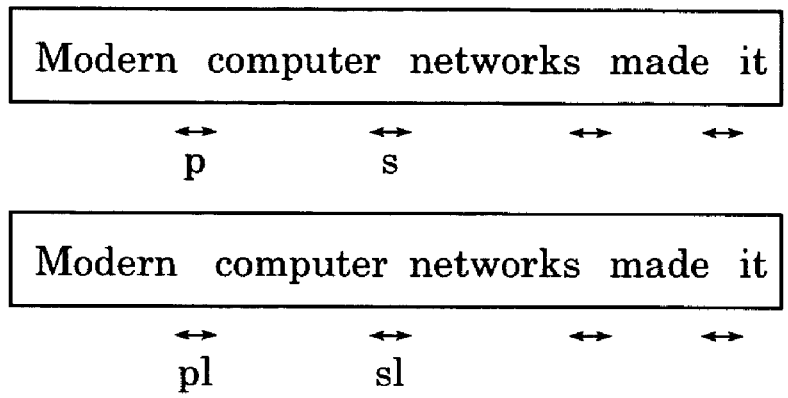
FIG. 1 illustrates the electronic watermark embedding method using the interval of the character.
Figure 2:
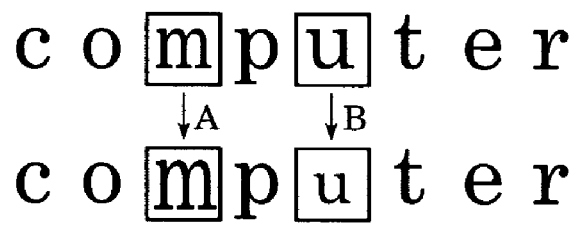
FIG. 2 illustrates the electronic watermark embedding method using the size of the character.
Figure 3:
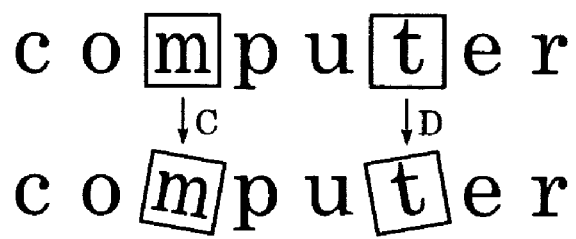
FIG. 3 illustrates the electronic watermark embedding method using the lean of a character.
Figure 4:
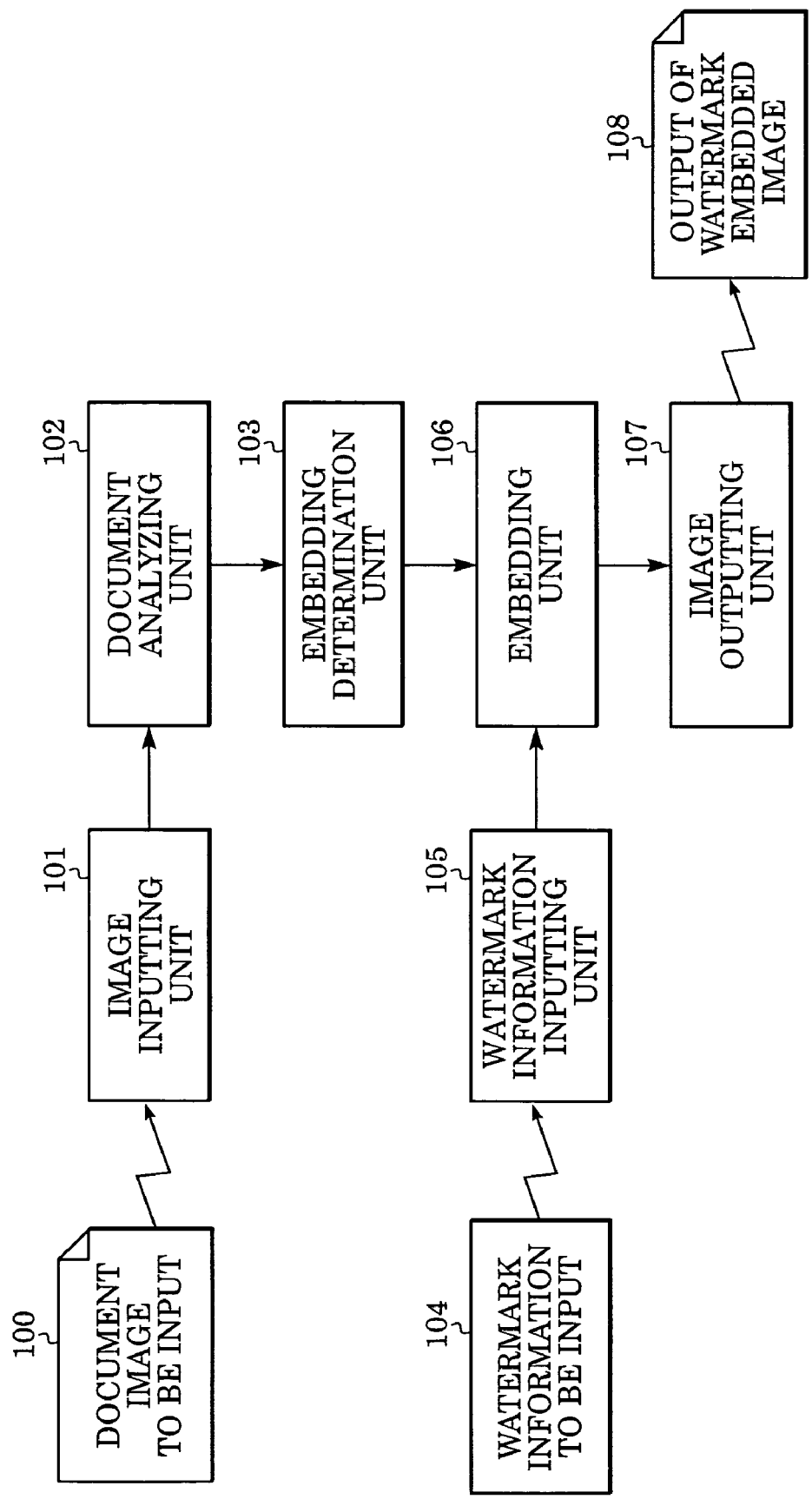
FIG. 4 is a block diagram of the digital watermark embedding apparatus of the present invention.

FIG. 4 is a block diagram of the digital watermark embedding apparatus of the present invention.

As shown in FIG. 4, a document image 100 which is an object that is to have watermark message embedded therein is input into an image inputting unit 101. The image inputting unit 101 provides the document image 100 to an analyzing unit 102. In the document analyzing unit 102, the spatial relationship of the characters in the document image 100 are analyzed. After analyzing the document image 100, the analyzed document image is forwarded from the document analyzing unit 102 to an embedding determination unit 103. In the embedding determination unit 103, it is determined whether a digital watermark can be embedded in the document image 100. If the embedding determination unit 103 determines that a digital watermark can be embedded in the document image 100, the document image 100 is forwarded to an embedding unit 106.

Watermark message 104 to be input is input via a watermark message inputting unit 105. The watermark message 104 is forwarded from the watermark message inputting unit 105 to the embedding unit 106.

The embedding unit 106 embeds the document image 100 received from the embedding determination unit 103 with the watermark message 104 received from the watermark message inputting unit 105 to generate an output image that includes the embedded watermark. The image is forwarded from the embedding unit 106 to an image outputting unit 107 which outputs the watermarked image 108.

Figure 5:
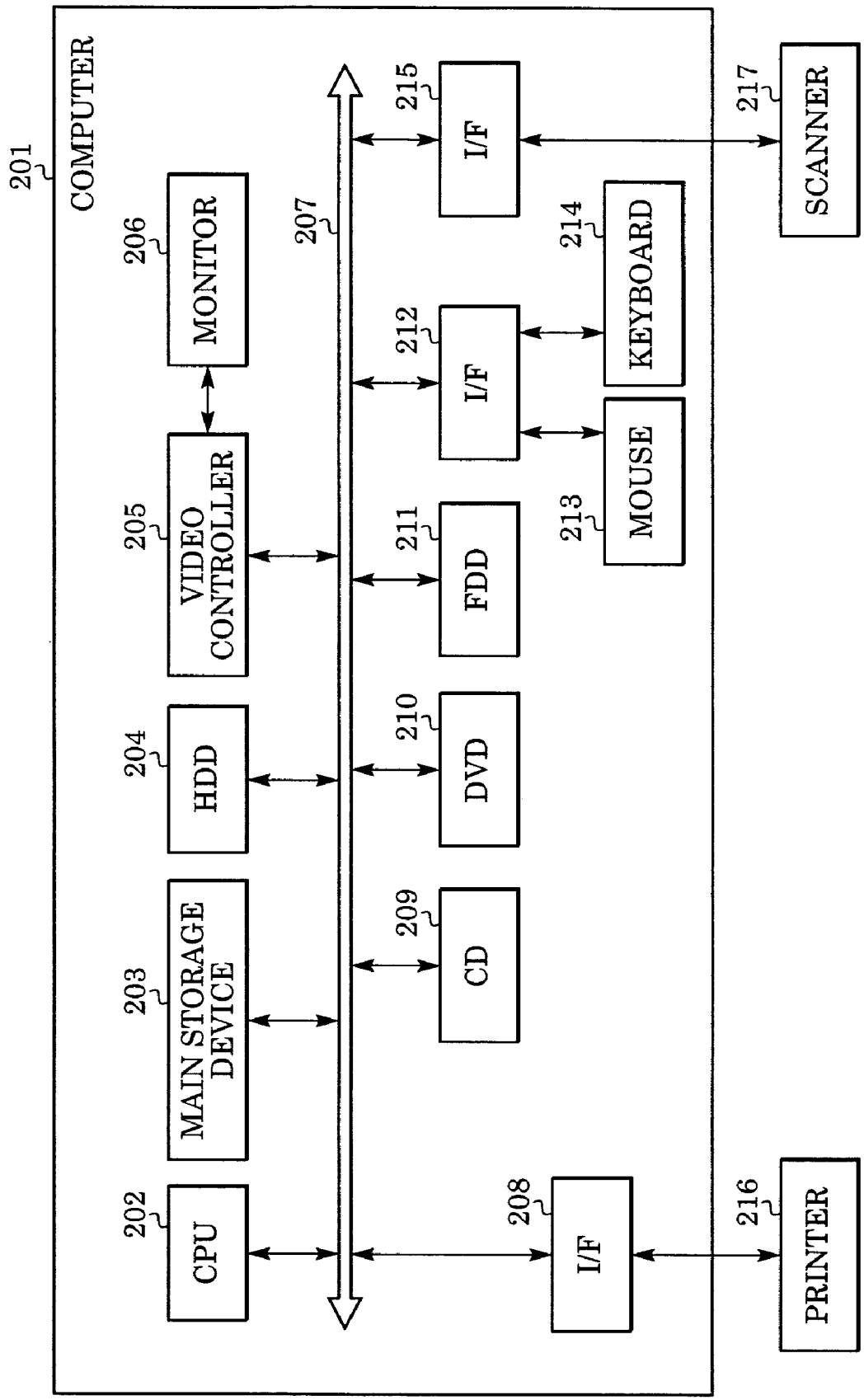
FIG. 5 illustrates the system provided with the digital watermark embedding and extracting apparatus of the present invention.

FIG. 5 is a block diagram illustrating system components of the digital watermark embedding and extracting apparatus of the present invention. It is not necessary to use all of the components (functions) shown in FIG. 5 in realization of the digital watermark embedding and extracting apparatus.

In FIG. 5, a computer 201 is general-purpose message processor, such as a personal computer. The computer 201 can input the image 100 read by a scanner 217. The computer 201 can perform editing and storage. The image 100 obtained by the scanner 217 can be printed by a printer 216. A user can perform various operations by inputting message to the computer 201 via an interface (I/F) 212 using a mouse 213 and/or a keyboard 214. In the computer 201, the various components are connected by a bus 207 which is used for transferring data among the various components.

In FIG. 5, a central processing unit (CPU) 202 controls operation of the components in the computer 201. The CPU 202 can execute stored programs. The programs can be stored in a main storage device 203 which includes a random access memory (RAM). In addition to storing programs, the RAM is used to temporarily store image data of an object for the processing performed in the CPU 202. A hard disk drive (HDD) 204 is a device that can store the program and image data which are transmitted to the main storage device 203. The HDD can also be used to save other data, for example, the image data after processing.

A scanner interface (I/F) 215 is connected with the scanner 217 which reads a manuscript, a film, etc. and generates image data. The scanner I/F 215 is an interface for inputting the image data obtained with the scanner 217 into the computer 201. A printer I/F 208 is an interface for transmitting the image data to the printer 216.

The computer also includes drives for reading data from or writing data to an external storage medium. A compact disk (CD) drive 209 is a device for reading data stored on a CD (e.g., CD-R (CD-recordable) or CD-RW (CD-rewritable)) or writing data to the CD. An FDD drive 211 is a device for reading data stored on a floppy disk (FD) or writing data to the FD. A DVD drive 210 is a device for reading data stored on a DVD (digital versatile disk) or writing data to the DVD. In cases where the program for image editing or the printer driver is stored on a CD, FD, DVD, etc., these programs are installed on an HDD 204 and transmitted to the main storage device 203 if needed.

An input device interface (I/F) 212 is an I/F connected to one or more input devices, such as a keyboard 214 and a mouse 213 in order to receive input from the input devices 213, 214. A monitor 206 is a display which can display the extraction result and processing process of watermark message. A video controller 205 is a device for transmitting display data to the monitor 206.

Note that the present invention can be applied to an apparatus having a single device (for example, a copying machine, a fax etc.) or to system constituted by a plurality of devices (for example, a host computer, interface devices, scanner, printer etc.).

In the above-described arrangement, the computer 201 functions as the digital watermark embedding or extracting apparatus by executing the program loaded to the main storage device 203 with the input designation from the mouse 213 or keyboard 214, by the CPU 202. It is also possible to view an execution condition and its result by the monitor 206.

Methods of embedding a digital watermark and extracting the embedded digital watermark are described below.

Figure 6:
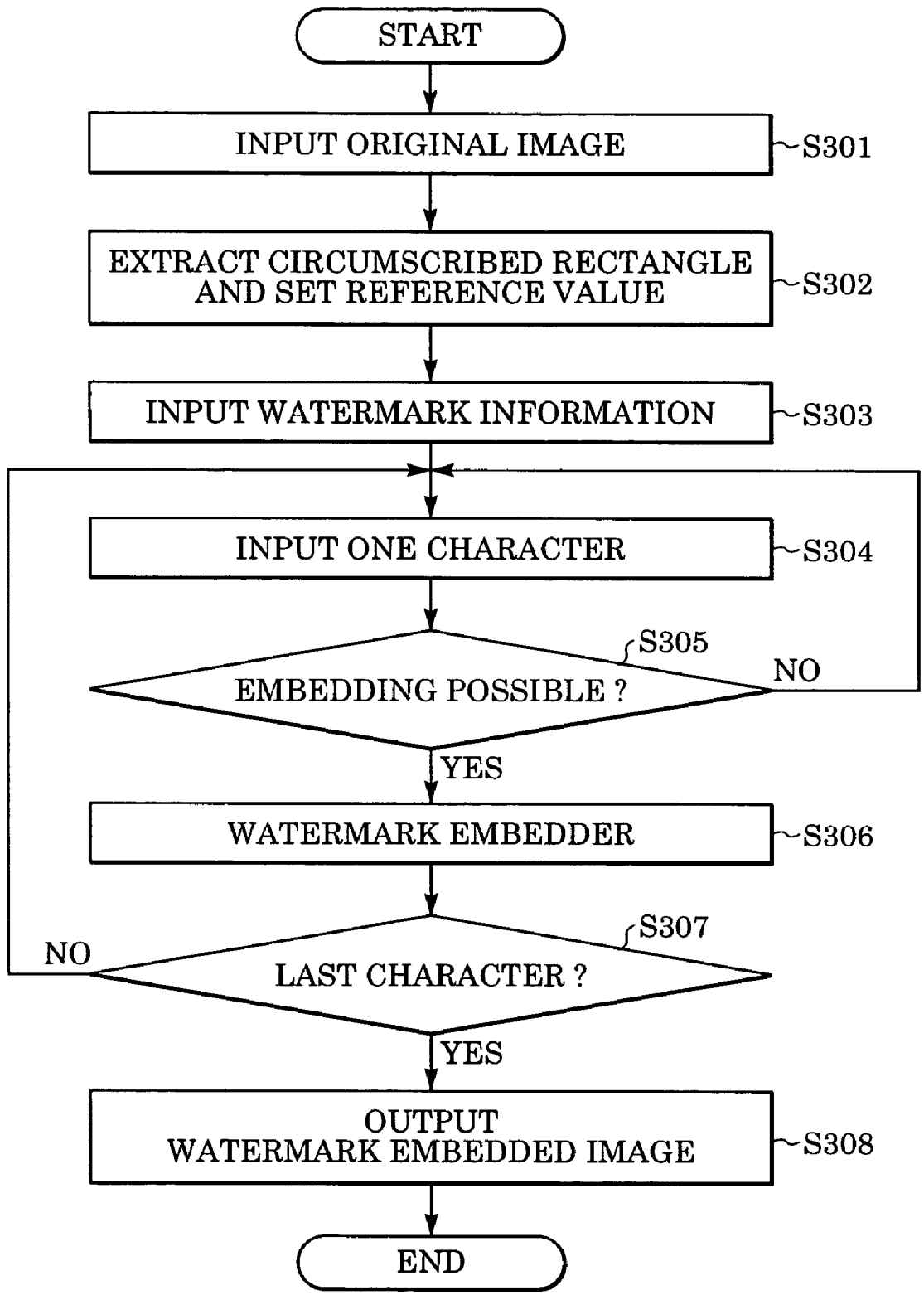
FIG. 6 is a flow chart illustrating the operation procedures of the digital watermark embedding apparatus in a first embodiment.

FIG. 6 is a flow chart illustrating operation procedures of embedding a digital watermark using the digital watermark embedding apparatus according to the first embodiment.

First, in step S301, the original document image 100 which is the embedding object of watermark message is input into the document analyzing unit 102 via the image inputting unit 101. In the watermark embedding apparatus shown in FIG. 5, an image inputting unit 101 for inputting the document image 100 is represented by the scanner 217. The document image data input into the document analyzing unit 102 may be bitmap data output by reading printed matter with the scanner 217, or electronic data created by using a text editing application program. The document image data can also be bitmap data output by converting electronic data, which is data of a particular form corresponding to the application program or text format, by using image processing software. The application program, text format and image processing software program may be stored on the hard disk 204, an external medium, such as a CD read using the CD drive 209, a DVD read using the DVD drive 210, an FD read using the FDD drive 211, or some combination thereof.

In step S302, an extraction of circumscribed rectangle (character area) and a setup of a reference value are performed by the document analyzing unit 102 according to the document image data input at step S301. The procedure of step S302 is explained in more detail below with reference to FIG. 7.

Figure 7:
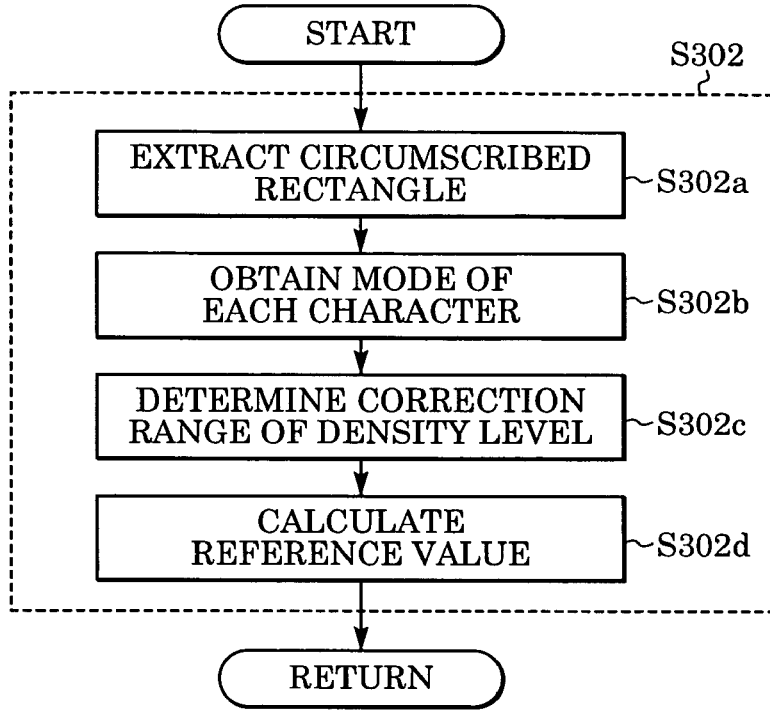
FIG. 7 is a flow chart illustrating the circumscribed rectangle extraction and a setup of a reference value in the first embodiment.

FIG. 7 is a flow chart showing processing details of step S302 of FIG. 6 of extracting a circumscribed rectangle setting up of a reference value according to the first embodiment. Each step of the flowchart shown in FIG. 7 is performed for the characters of the whole document.

The circumscribed rectangle of a character is a rectangle surrounding the character. In this embodiment, the circumscribed rectangle area shows the character area which is the object of the embedding of digital watermark. A search is performed for a blank part (portion which shows density other than the density of the character) by projecting each pixel value of the document image data to a vertical coordinate axis. The line in which a character exists using the search result is distinguished. Then, a search is performed for the blank part by projecting each pixel value of the document image data to a horizontal-coordinates axis per line. The circumscribed rectangle area of the character is distinguished by using the search result. The above-described processing extracts the circumscribed rectangle of each character (step S302$a$).

Next, a density histogram of each of the extracted characters is calculated, and the most frequent value of each of the characters is determined (step S302$b$). Here, the density histogram is a plot of the frequency of the density value of all of the pixel data in the circumscribed rectangle area of each character. The frequency shows the number of times of an appearance of the same density value in one character. In this embodiment, since the density histogram is created based on the pixel data of the circumscribed rectangle area of a character, the frequency of the density value of the portion which is not a character becomes the highest. The "most frequent value" in this embodiment is taken as the density value with the highest frequency from the histogram except the density value of the portion which is not a character. For example, in graph 1 of FIG. 9 (described later), the density value of the portion which is not the character is set to 200 to 255.

In cases where the density histogram is not created based on the pixel data of the circumscribed rectangle area but is created based on the pixel data of only a character part, it is not necessary to perform processing for removing the pixel data of the portion which is not a character. In this embodiment, the "most frequent value" is a density value with the highest frequency in the character part (regardless of the method used for creating the density histogram).

Based on the most frequent value of each character obtained by step S302$b$, the maximum and the minimum are extracted out of the most frequent values for all the characters in the document image. For example, the minimum of the most frequent value is assumed to have been "a" and the maximum of the most frequent value is assumed to have been "b". The value from the minimum "a" to the maximum "b" is determined as a correction range (described later) (step S302$c$).

The middle value between the minimum "a" and the maximum "b" is calculated. Let the middle value be reference value "t." That is, t=(a+b)/2 (step S302$d$). The reference value is used for the criterion of determination when extracting watermark message. Here, the reference value may be required for watermark extraction, and may be stored in storage device. A user may store the reference value secretly as a key for watermark extraction. The reference value may be embedded as watermark message in the document image data.

Although the reference value was set to t=(a+b)/2 in the above, it is not limited to this value. The reference value should be a predetermined value in the correction range. Although the reference value was calculated from the most frequent values of all of the characters in the document image, it is not limited to this. For example, the reference value may be the most frequent value of one character which appeared first, or the reference value may be calculated from the most frequent values of a plurality of characters. After the reference value is calculated (step 302$d$ of FIG. 7), processing returns to FIG. 6.

After a circumscribed rectangle is extracted and a reference value is set up in step S302, processing proceeds to step S303 of FIG. 6. In step S303, the watermark message 104 to embed is input from the watermark message inputting unit 105 by using keyboard 214. The watermark message may be selected from data stored in the storage device, e.g., HDD 204.

Next, one character is input in step S304. In step S305, the embedding determination unit 103 determines whether the character input in step S304 is a character that can embed the watermark based on the size of the circumscribed rectangle. Characters that are too small to have a watermark embedded are exempted from having a watermark embedded. If it is determined in step S305 that embedding is not possible for the character input at step S304 (no in step S305), processing returns to step S304 and the next character is inputted.

If it is determined in step S305 that embedding is possible for the character input at step S304 (yes in step S305), processing proceeds to step S306. In step S306, the embedding unit 106 embeds the digital watermark to the character input at step S304. A process performed by the embedding unit 106 for shifting the position of the most frequent value in the density histogram of a character to right and left according to one of the digital watermark embedding methods in is explained next.

Figure 9:
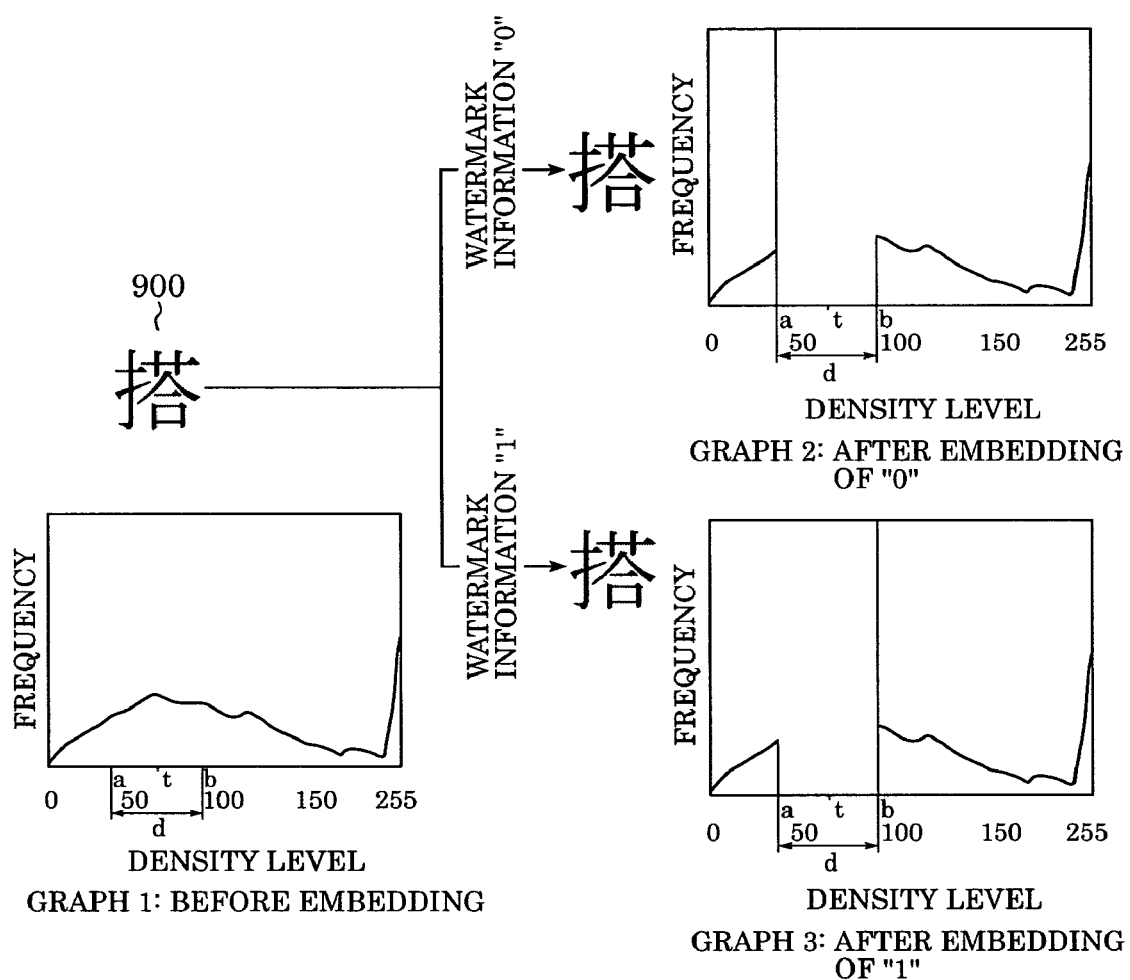
FIG. 9 illustrates a density histogram before and after the digital watermark embedding in the first embodiment.

FIG. 9 is a figure illustrating the density histogram before and after the digital watermark embedding in the first embodiment.

Graph 1 of FIG. 9 is a density histogram of a character 900. In this embodiment, the density value of a character is expressed by 256 gradations, a black density value is set to "0," and a white density value is set to "255." In graph 1 of FIG. 9, the left end of a graph shows density value "0" (black), and the right end shows density value "255" (white).

The graph shows the minimum of the most frequent value ("a") and the maximum of the most frequent value ("b") of the document image calculated in step S302. Furthermore "d" of the graph is a value from "a" to "b" and shows the correction range. The graph also shows the reference value "t" (t=(a+b)/2).

Graph 2 in FIG. 9 is a graph which shifted the position of the most frequent value in the density histogram of the character to the left, and shows the case where "0" is embedded. Graph 3 in FIG. 9 is a graph which shifted the position of the most frequent value of the character to the right, and shows the case where "1" is embedded.

In cases where the position of the most frequent value in the density histogram of the character is shifted to the left, the watermark is embedded so that it may be shown with the graph 2 of FIG. 9, and the density values of the pixels contained in the correction range "d" are corrected to "a". The density values of the pixels contained from "0" to "a" and the pixels contained from "b" to "255" are not corrected. Since the density values of the pixels from "a" to "b" which include the reference value "t" is changed into "a," the most frequent value of the character is set to "a" (the graph 2 in FIG. 9).

In cases where the position of the most frequent value in the density histogram of the character is shifted to the right, the watermark is embedded so that it may be shown with the graph 3 of FIG. 9, and the density values of the pixels contained in the correction range "d" are transformed to "b." The density values of the pixels contained from "0" to "a" and the pixels contained from "b" to "255" are not corrected. Since the density values of the pixels from "a" to "b" which include the most reference value "t" is changed into "b," the most frequent value of the character is set to "b" (the graph 3 in FIG. 9).

The digital watermark message is embedded using the spatial relationship of the most frequent value in the density histogram. For example, in cases where "0" is embedded, the density value is corrected so that it may be set to "most frequent value<t," and in cases where "1" is embedded, the density value is corrected so that "most frequent value>t."

Figure 8:
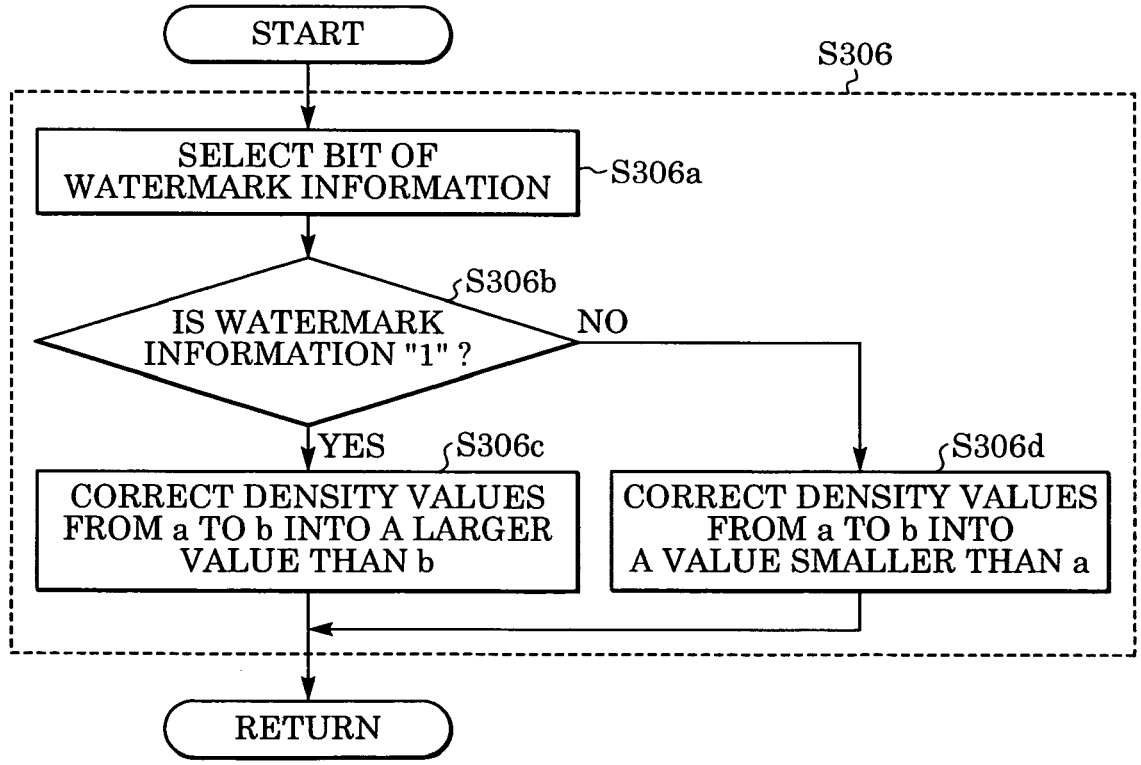
FIG. 8 is a flow chart illustrating the electronic watermark embedding method in the first embodiment.

FIG. 8 is a flow chart illustrating processing of embedding an electronic watermark (step S306 of FIG. 6) in the first embodiment.

Figure 24:
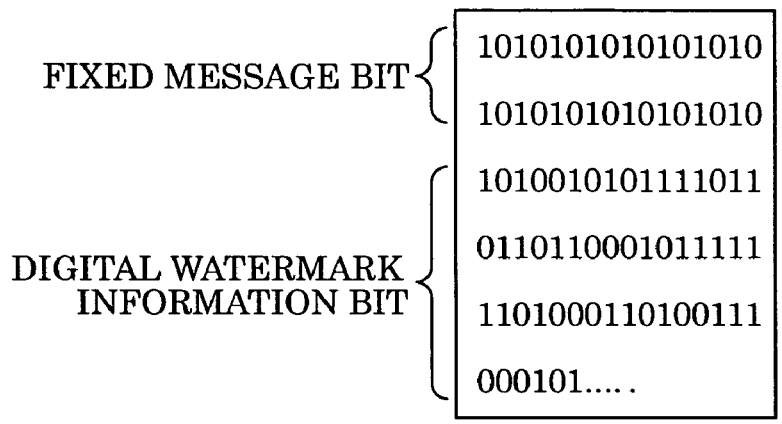
FIG. 24 is a figure illustrating a fixed message bit and a digital watermark message bit in a fourth embodiment.

First, in step S306a, the watermark message bit to embed is selected. For example, "1" is assigned to the first character in cases where it is input, such as is shown in the example in FIG. 24.

In step S306b, it is determined whether the watermark message bit to embed is "1." If it is determined in step S306b that the watermark message bit is "1" (yes in step S306b), processing proceeds to step S306c. In step S306c, the density values from "a" to "b" are corrected to a value larger than "b" so that "most frequent value>t." Processing then returns to FIG. 6.

If it is determined in step S306b that the watermark message bit is not "1" (no in step S306b), processing proceeds to step S306d. In step S306d, the density values from "a" to "b" are corrected to a value smaller than "a" to set "most frequent value<t." The range from "a" to "b" is the correction range of the density histogram obtained by step S302c (FIG. 7), and "t" is the reference value (calculated in step S302d of FIG. 7) used when extracting watermark message. Processing the returns to FIG. 6.

In step S307 of FIG. 6, it is determined whether the character input at step S304 is the last character in the document image. If it is determined that the character input at step S304 is the last character in the document image (yes at step S307), processing proceeds to step S308. In step S308, the watermarked image is output from image outputting unit 107. The output may be to print the image with the embedded watermark message, to store the image with the embedded watermark message as image data, to transmit the image with the embedded watermark message to one or more other terminals, etc. Processing then returns to FIG. 6.

On the other hand, if it is determined in step S307 that the character input at step S304 is not the last character in the document image (no at step S307), processing returns to step S304, and the next character is input.

Figure 10:
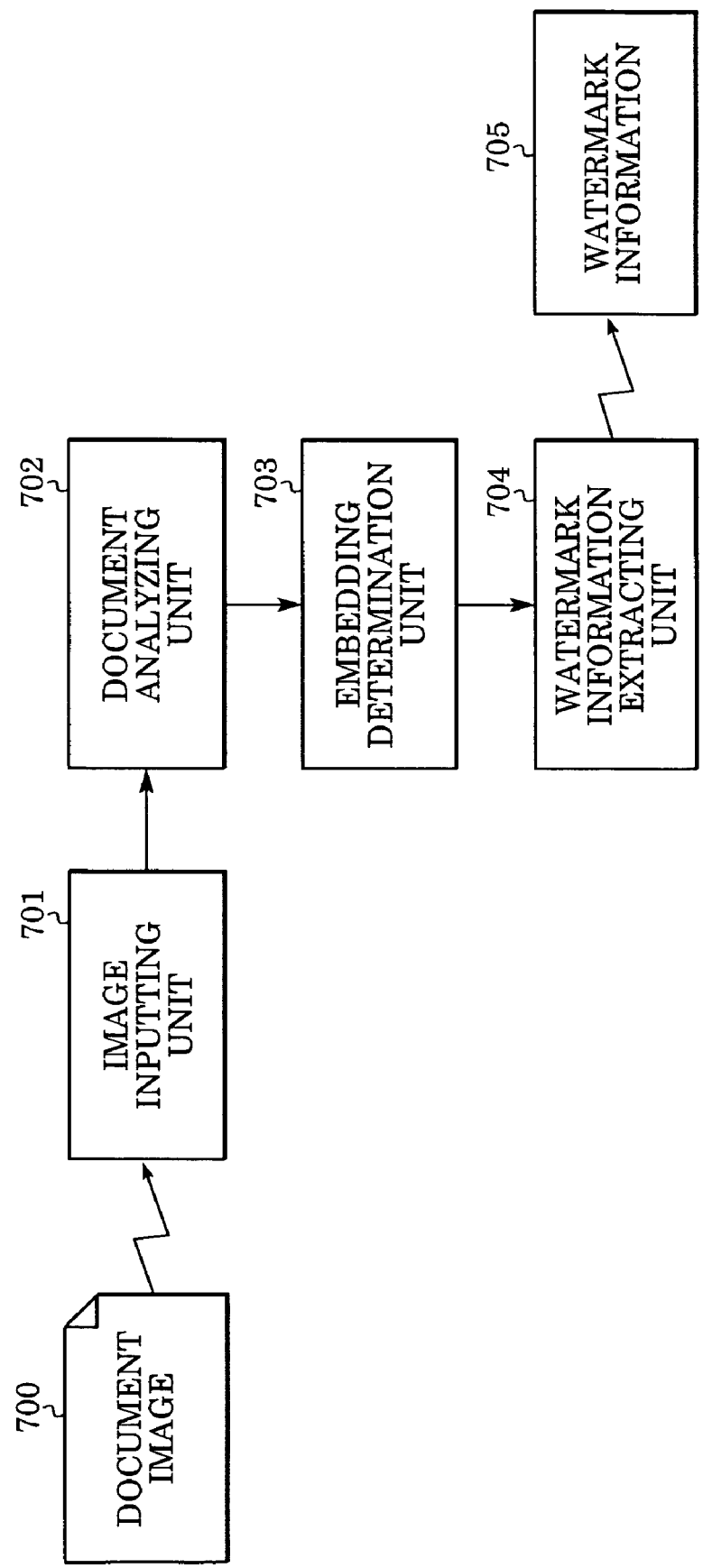
FIG. 10 is a block diagram of the digital watermark extracting apparatus of the present invention.

FIG. 10 is a block diagram of the digital watermark extracting apparatus in this invention.

As shown in FIG. 10, document image 700 which is the extracting object of embedded watermark message is input into image inputting unit 701 represented by the scanner 217 of FIG. 5. The spatial relationship of the character is analyzed by document analyzing unit 702. A determination of whether there is embedding is made in embedding determination unit 703. A watermark message extracting unit 704 extracts a digital watermark, and outputs watermark message 705.

Figure 11:
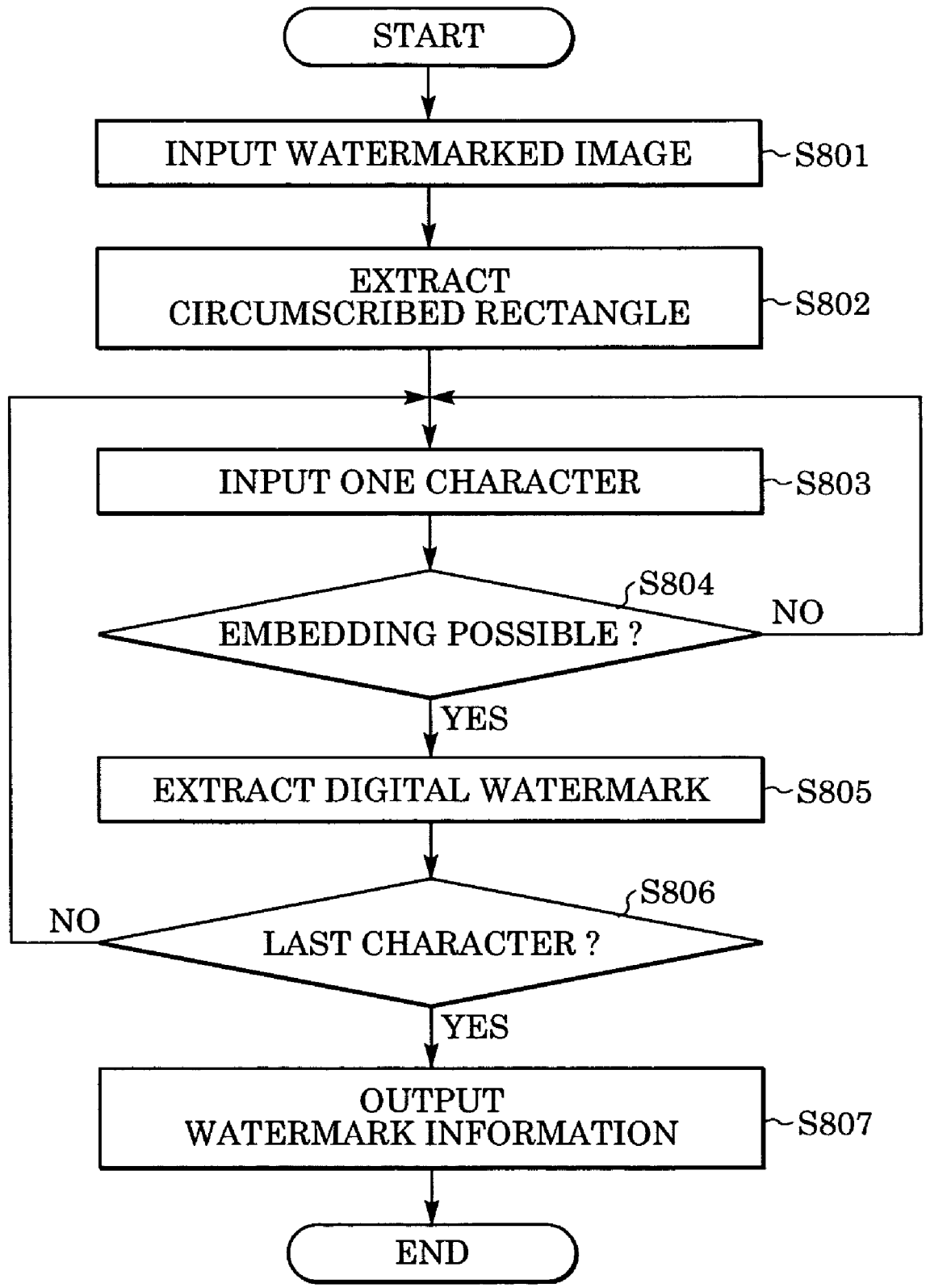
FIG. 11 is a flow chart illustrating operation procedures of the digital watermark extraction in the first embodiment.

FIG. 11 is a flow chart illustrating operation procedures of digital watermark extraction in the first embodiment.

First, in step S801, the watermarked image is input.

In step S802, the circumscribed rectangle (character) is extracted from the image. The document image 700 used as the object for extraction is input into the document analyzing unit 702 via the image inputting unit 701 represented by the scanner 217 of FIG. 5. The document image data input into the document analyzing unit 702 may be the bitmap data output by reading printed matter with the scanner 217, or electronic data created by using a text editing application program. The document image data may also be bitmap data output by converting electronic data, which is data of a particular form corresponding to the application program or text format stored on the hard disk 204 or on a storage medium connected to a drive, such as a CD read by the CD drive 209, a DVD read by the DVD drive 210 or an FD read by the FDD drive 211, by using image processing software.

Next, one character is input in step S803. In step S804, it is determined by the embedding determination unit 703 whether the circumscribed rectangle area of the input character is the area of the character in which the digital watermark is embedded. The embedding determination unit 703 is similar to that of the embedding determination unit 103 of FIG. 4, and the character in which the watermark is embedded correctly can be determined.

If it is determined in step S804 that a digital watermark is not embedded (no in step S804), processing returns to step S803 and the next character is input. If it is determined in step S804 that a digital watermark is embedded (yes in step S804), processing proceeds to step S805. In step S805, the watermark message is extracted by the watermark message extracting unit 704. Details of step S805 of extracting the digital watermark are provided next with reference to FIG. 12.

Figure 12:
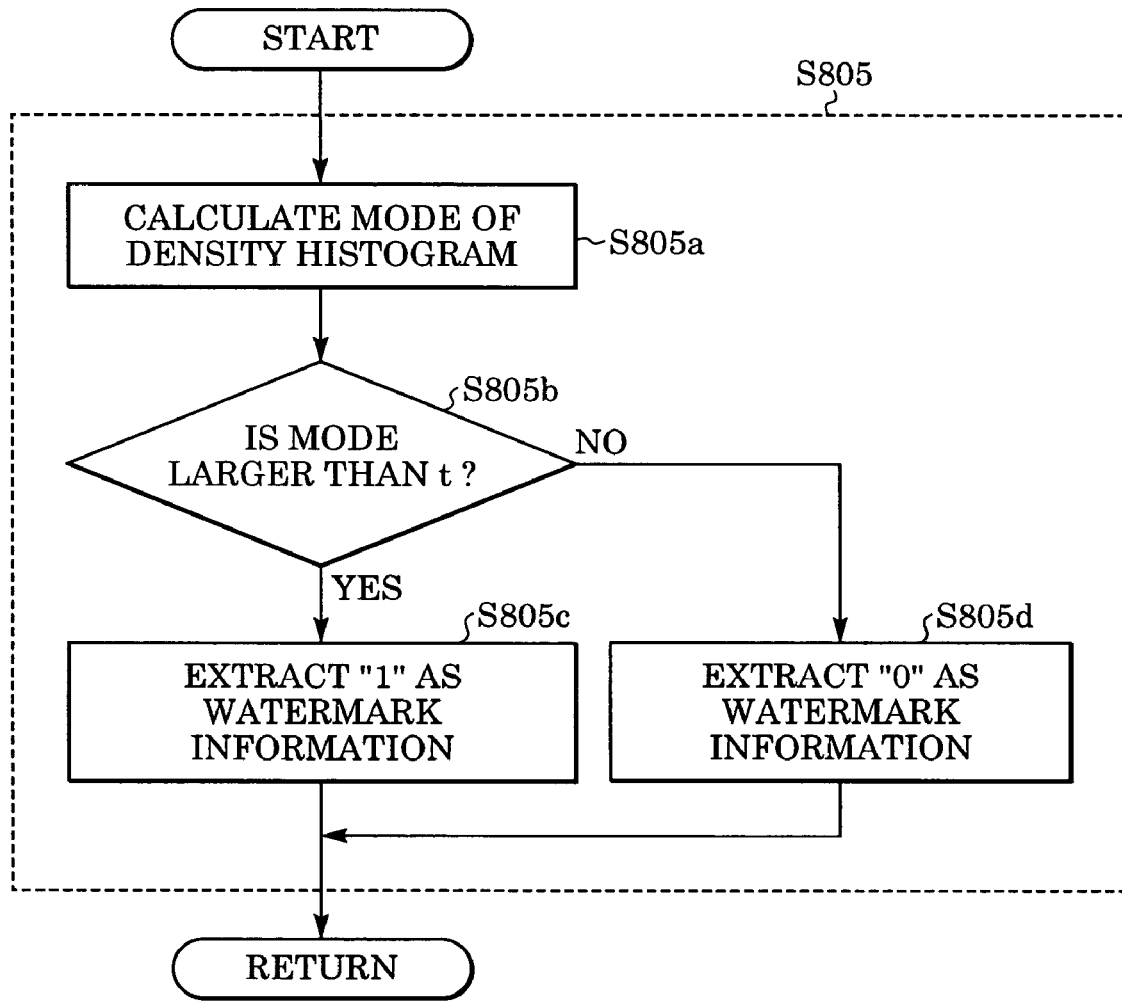
FIG. 12 is a flow chart illustrating the digital watermark extraction method in the first embodiment.

FIG. 12 is a flow chart illustrating the digital watermark extraction method in the first embodiment.

First, the most frequent value of the density histogram is calculated (step S805a). Next, in step S805b, it is determined whether the calculated most frequent value is larger than the reference value "t." In cases where the most frequent value is larger than "t" (yes in step S805b), "1" is extracted as watermark message (step S805c). In cases where the most frequent value is not larger than "t" (no in step S805b), "0" is extracted as watermark message (step S805d). The "t" is the reference value which extracts watermark message, i.e., key message. A user may input the reference value "t" using a keyboard, or the reference value "t" may be stored beforehand in the storage device. After extracting the watermark message (in step S805c or step S805d), processing returns to FIG. 11.

Next, at step S806 it is determined whether the character input in the step S803 is the last character. in cases where it is not the last character, processing returns to step S803 to input the next character. In cases where it is the last character, watermark message is output (step S807) and processing returns to FIG. 9.

<First Modification>

Figure 13:
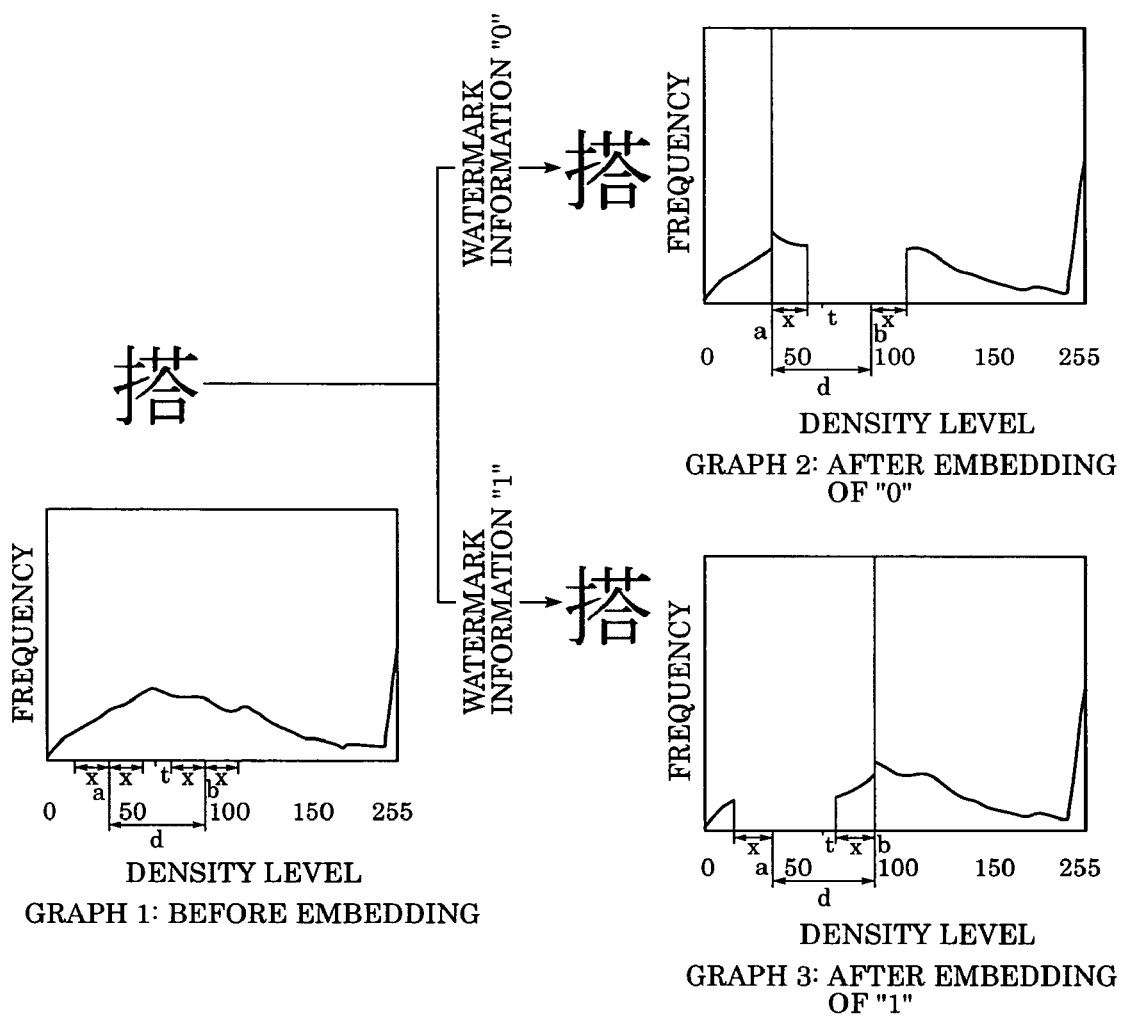
FIG. 13 shows a density histogram before and after the digital watermark embedding in a first modification.

FIG. 13 illustrates the density histogram before and after the digital watermark embedding in the first modification. An arrangement and procedure for operation of the first modification are the same as that of the first embodiment (described above) except for step S306.

Figure 14:
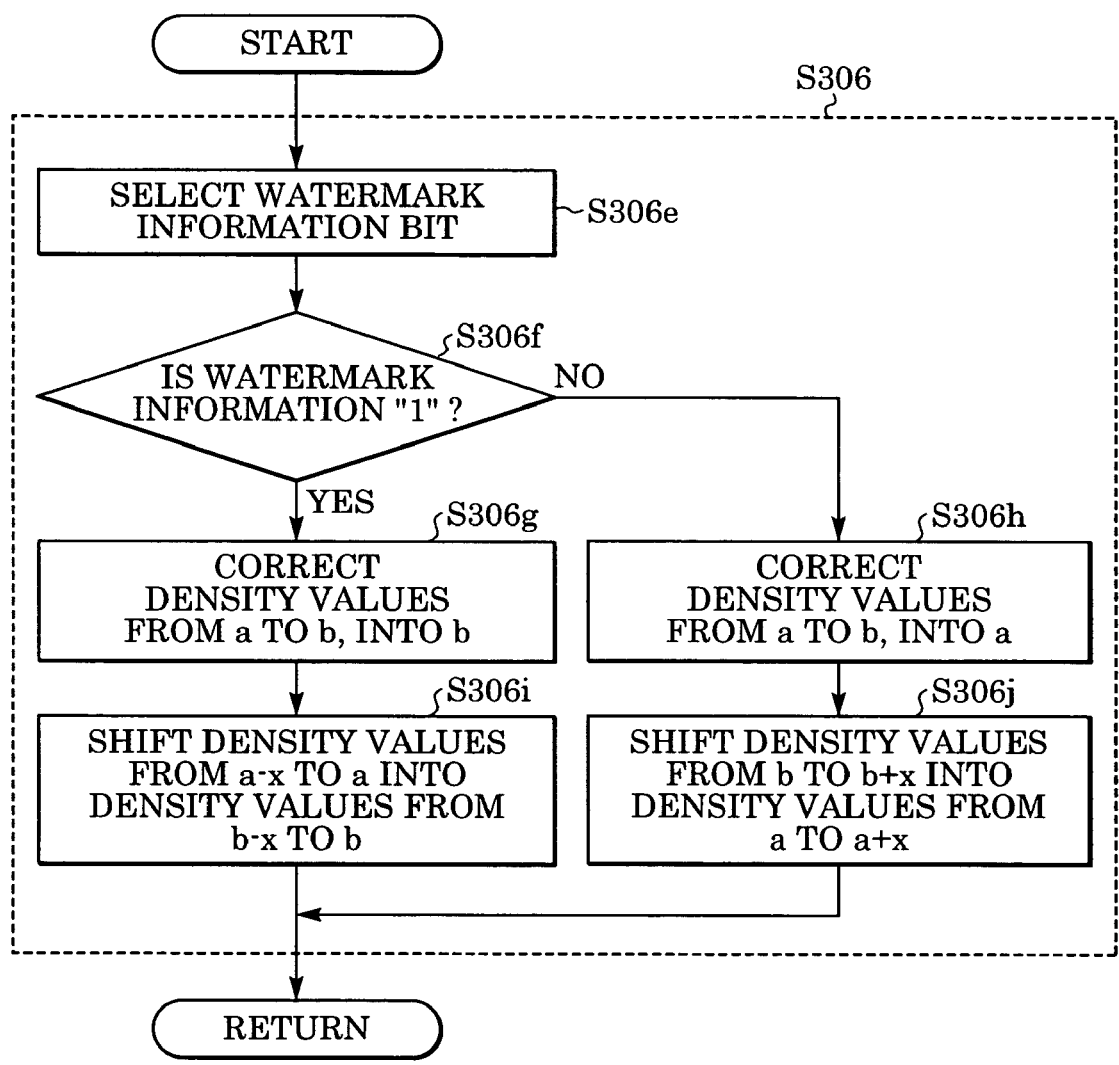
FIG. 14 is a flow chart illustrating operation procedures of embedding a digital watermark of the first modification.

FIG. 14 is a flow chart illustrating operation procedures of step S306 of the first modification.

First, in step S306e, the watermark message bit to embed is selected. For example, "1" is assigned to the first character in cases where it is input, such as is shown in the example (digital watermark message bit) in FIG. 24.

In step S306f, it is determined whether the watermark message bit to embed is "1." If it is determined that the bit to embed is "1" (yes in step S306f), processing proceeds to step S306g. In step S306g, the density values from "a" to "b" are corrected to "b" and in step S306i, the density values from "a−x" to "a" are shifted into the density values from "b−x" to "b," to set "most frequent value>t." This can prevent the most frequent value from being generated in the area of the density value from "a−x" to "a" by a gap of the color after a scan. Processing then returns to FIG. 6. If it is determined that the bit is not "1" (no in step S306f), processing proceeds to step S306h. In step S306h, the density values from "a" to "b" are corrected to "a" and in step S306j, the density values from "b" to "b+x" are shifted into the density values from "a" to "a+x," to set "most frequent value<t." This can prevent the most frequent value from being generated in the area of the density value from "b" to "b+x" by a gap of the color after a scan. x is $0 \leq x < a$ or $0 \leq x < 255-b$. "a" and "b" may be decided beforehand to satisfy the above-expression. "a" and "b" may be set by the user.

The procedure of extracting the digital watermark is the same extracting processing in the first embodiment.

Thus, in the first modification, even if a gap of a color arises at the time of a scan, the watermark message (most frequent value) can be extracted more correctly.

<Second Modification>

Figure 15:
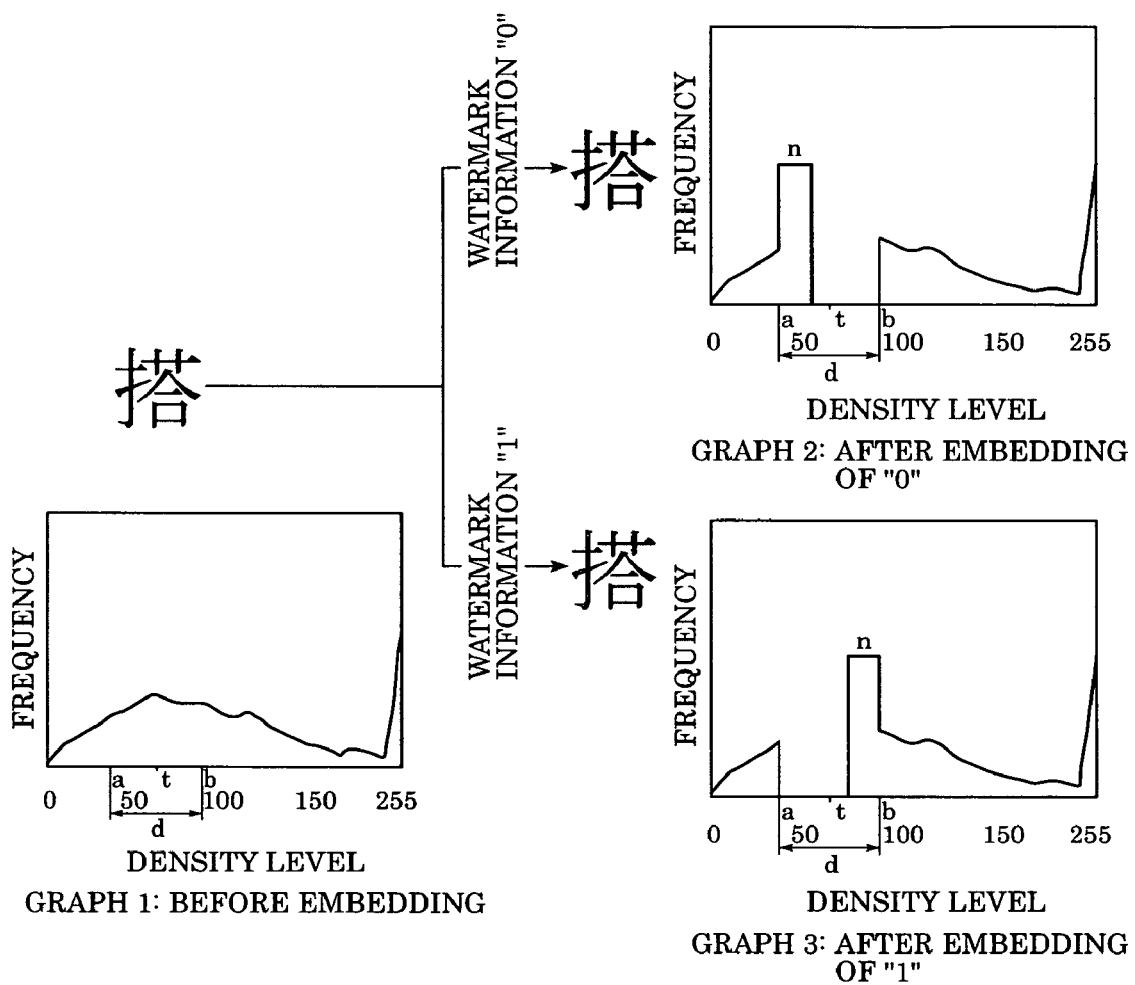
FIG. 15 illustrates a density histogram before and after the digital watermark embedding in a second modification.

FIG. 15 is a density histogram before and after the digital watermark embedding in a second modification. An arrangement and procedure for operation are the same as that of the first embodiment (described above) except for step S306.

Figure 16:
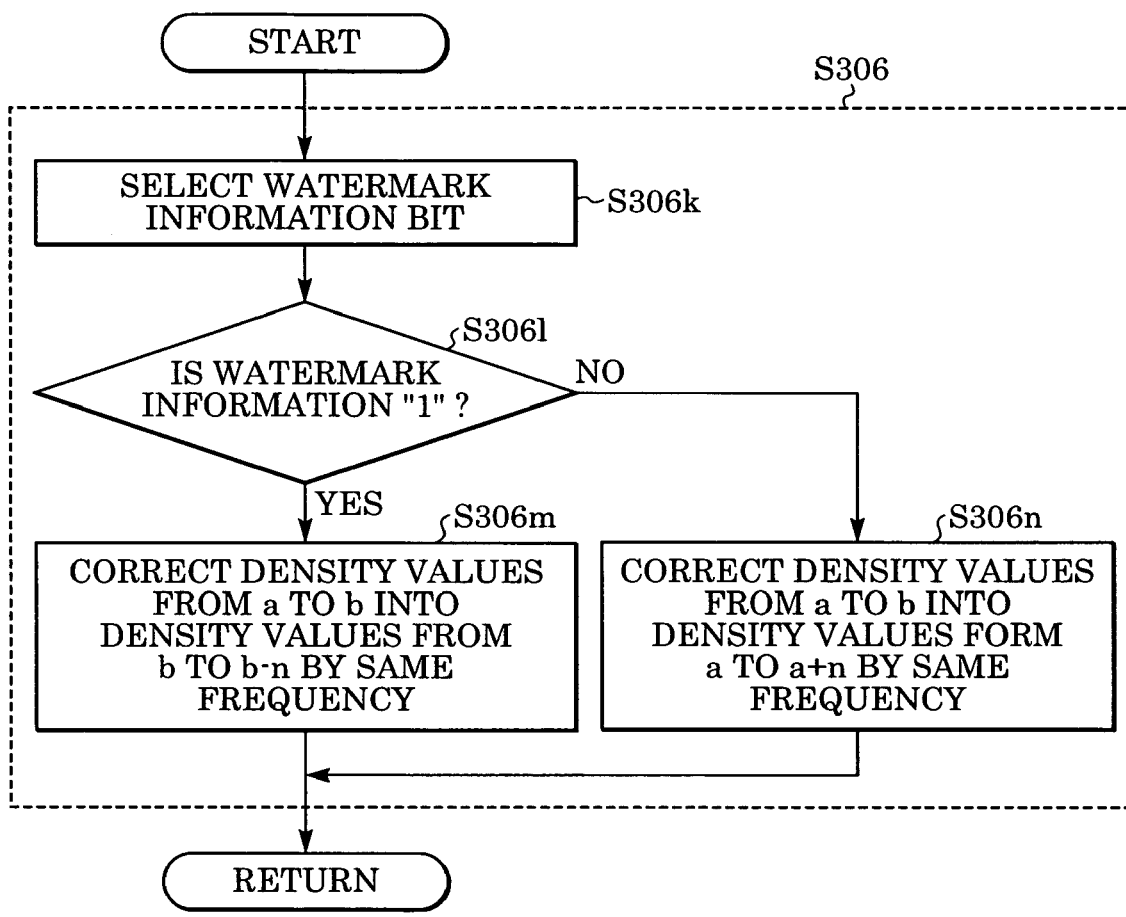
FIG. 16 is a flow chart illustrating operation procedures of embedding a digital watermark of the second modification.

FIG. 16 is a flow chart illustrating operation procedures of Step S306 of the second modification.

First, in step S306k, the watermark message bit to embed is selected. For example, "1" is assigned to the first character in cases where it is input, such as is shown in the example (digital watermark message bit) in FIG. 24.

In step S306l, it is determined whether the watermark message bit to embed is "1."

If it is determined that the watermark message bit to embed is "1" (yes in step S306l), processing proceeds to step S306m. In step S306m, the density values from "a" to "b" are corrected into "b−n" to "b" by the same frequency. That is, the density histogram after change becomes like graph 3 of FIG. 15, and the most frequent value turns into density values from "b−n" to "b." "n" is an integer with which $0 < n < (b-a)/2t$ is satisfied.

If it is determined that the watermark message bit to embed is not "1" (no in step S306l), processing proceeds to step S306n. In step S306n, the density values from "a" to "b" are corrected into "a" to "a+n" by the same frequency.

In order to lessen degradation of a color, the data near "a" is changed to a value near "a," and the data near "b" is changed to a value near "a+n."

The procedure of extracting the digital watermark is performed using the same extracting processing as the first embodiment. Thus, in the second modification, when embedding watermark message, degradation of a color can be lessened by changing into the density near the density of an original image within limits which have substantially the same width (here, it is from "a" to "a+n," or from "b−n" to "b").

The range of the density after change may not be limited to this, and may be a range from "a−n" to "a+n," and a range from "a−m" to "a" (where 0<m<t). When embedding the message on "0," the density values from "a" to "b" are changed into the density values from "a" to "a+n" to exist by the same frequency, but it is not necessary to exist by the same frequency.

Although the first embodiment, first modification, and second modification are described with right and left of the moving width value of the density histogram, the width value which shifts to right and left may be taken separately. For example, when shifting "x" of the first modification, and "n" of the second modification to right and left, it does not matter even if it takes a different value.

Second Embodiment

The first embodiment, first modification, and second modification described how to extract watermark message, by extracting the position of the most frequent value. The second embodiment describes how to extract watermark message by extracting a frequency that does not appear in the range or that is below a certain frequency in a density histogram.

Figure 17:
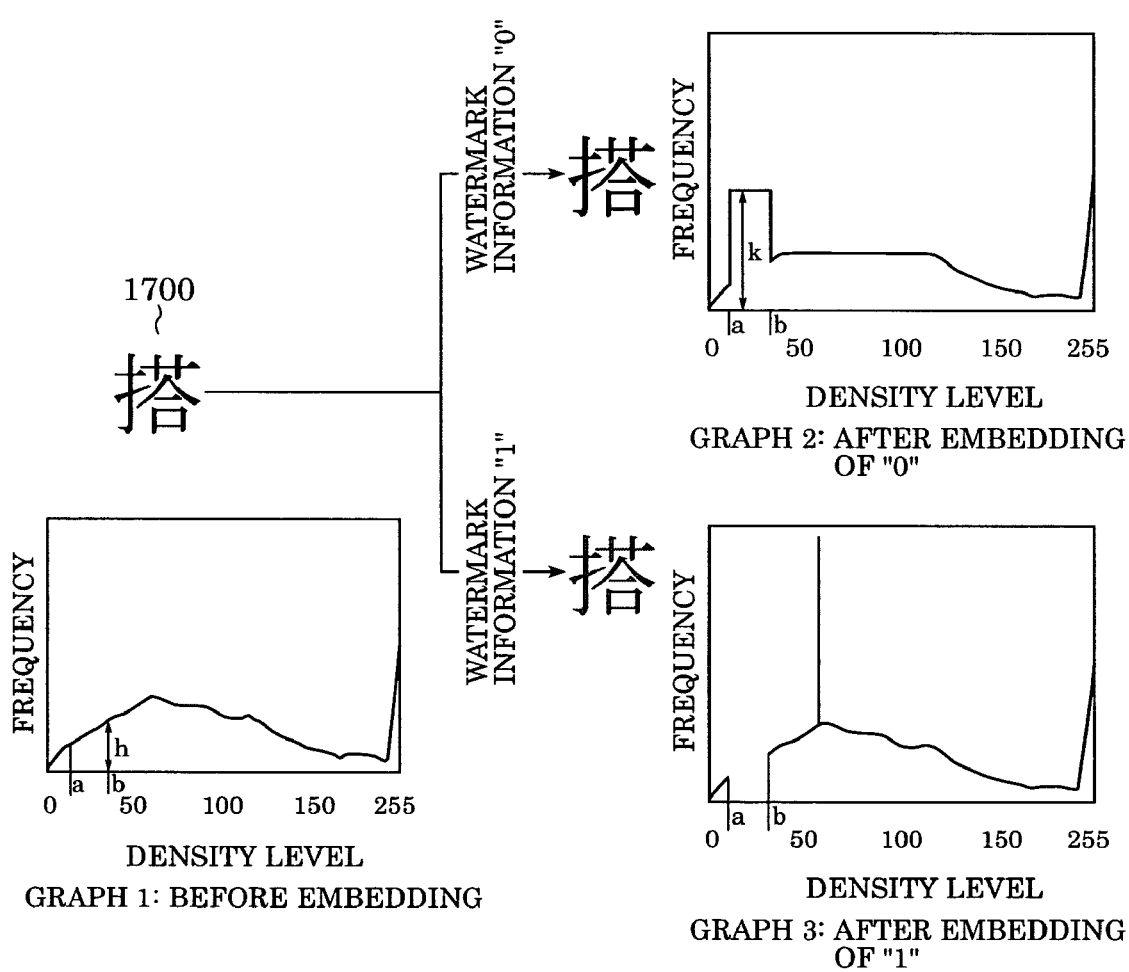
FIG. 17 illustrates a density histogram before and after the digital watermark embedding in a second embodiment.

FIG. 17 is a density histogram before and after the digital watermark embedding in the second embodiment.

Graph 1 of FIG. 17 is a density histogram of a character 1700. In this embodiment, the density value of a character is expressed by 256 gradations, a black density value is set to "0," and a white density value is set to "255." In graph 1 of FIG. 17, the left end of a graph shows density value "0" (black), and the right end shows density value "255" (white).

The section from "a" to "b" in the graph is the section (it expresses as [a, b]) of the density value which embeds watermark message, and are minimum "a" and maximum "b." "a" and "b" may be decided beforehand in the range which fulfills the following conditions expression:

$$0 \leq a < b \leq 200$$

"h" in the graph is the highest frequency among [a, b]. The values for "a" and "b" may be set by the user.

Graph 2 of FIG. 17 expresses the case where "0" is embedded, by making a part of larger density value than b of a density histogram change into [a, b], and correcting all of the frequencies of [a, b] with "k." Graph 3 of FIG. 17 expresses the case where "1" is embedded by making all the density values of [a, b] change into a certain larger value than b, and setting the frequency of [a, b] to "0." The watermark message is embedded by using the size of the frequency in a certain density section of the density histogram. For example, in cases where "0" is embedded, the density histogram is corrected so that the frequency in the section may become more than "k." In cases where "1" is embedded, the density histogram is corrected so that the frequency in the section may be set to "0."

An arrangement and procedure for operation in the second embodiment are the same as that of the first embodiment except for steps S302, S306 and S805.

Figure 18:
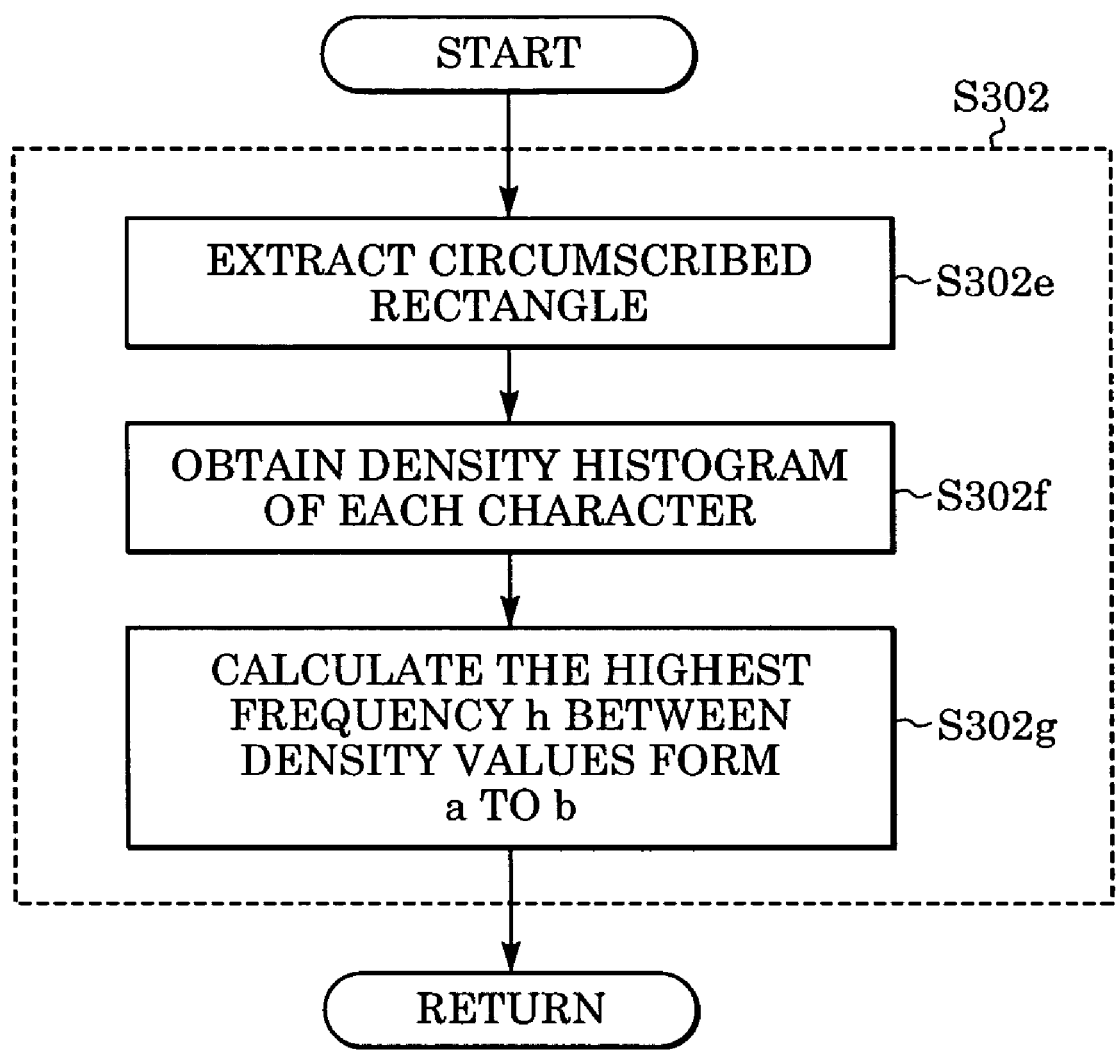
FIG. 18 is a flow chart illustrating operation procedures for extracting a circumscribed rectangle and setting a reference value in the second embodiment.

FIG. 18 is a flow chart illustrating the operation procedures of Step S302 in the second embodiment.

In step S302e, an extraction of circumscribed rectangle (character area) is performed according to the input document image data.

Next, the density histogram of each extracted character is calculated (step S302f).

In step S302g, the highest frequency h in the density value section ([a, b]) from "a" to "b" is calculated from the calculated density histogram. "a" and "b" may be decided beforehand decided in the range which fulfills the following expression. These values may be decided by a user.

$$0 \leq a < b \leq 200$$

Figure 19:
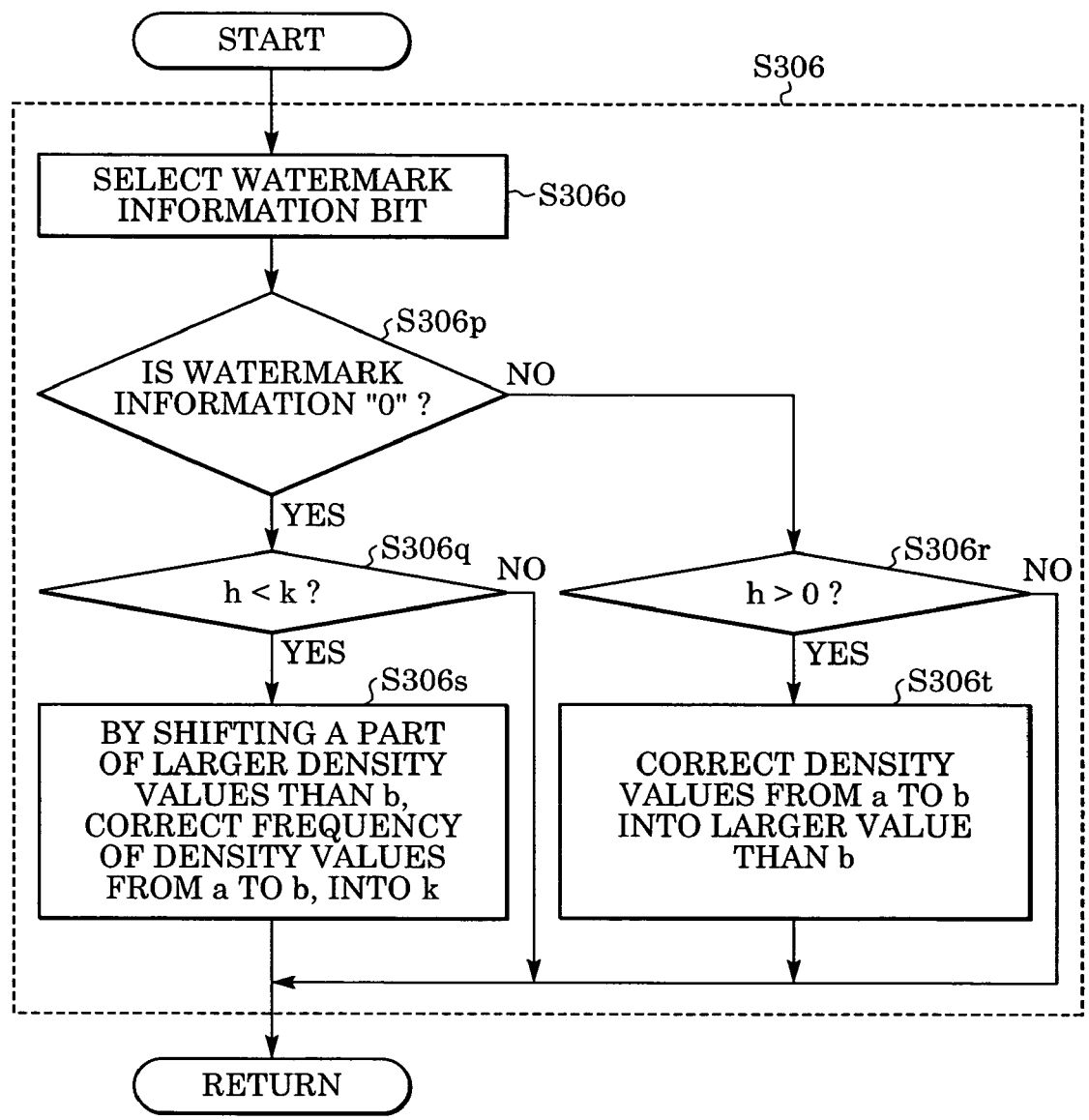
FIG. 19 is a flow chart illustrating operation procedures of embedding a digital watermark in the second embodiment.

FIG. 19 is a flow chart illustrating operation procedures of Step S306 in the second embodiment.

First, in step S306o, the watermark message bit to embed is selected. For example, "1" is assigned to the first character in cases where it is input, such as is shown in the example (digital watermark message bit) in FIG. 24.

In step S306p, it is determined whether the watermark message bit to embed is "0."

If it is determined in step S306p that the bit is "0" (yes in step S306p), processing proceeds to step S306q. In step S306q, it is determined whether frequency "h" is smaller than reference value "k" defined beforehand. The frequency "h" is the highest frequency in [a, b], and is calculated in step S302g. The reference value "k" is k>0, is used for embedding processing of the digital watermark, and is also used as key message of extraction of the digital watermark message. In cases where the "h" is smaller than reference value "k" (yes in step S306q), a part of density value larger than b are shifted to [a, b], and all of the frequency of [a, b] is set to "k" (step S306s). Processing then returns to FIG. 6.

If it is determined that the bit is "1" (no in step S306p), processing proceeds to step S306r. In step S306r, it is determined whether frequency "h" is larger than "0." In cases where the frequency "h" is larger than "0" (yes in step S306r), the density value of [a, b] are corrected to a value larger than "b" (step S306t). Processing then returns to FIG. 6.

Figure 20:
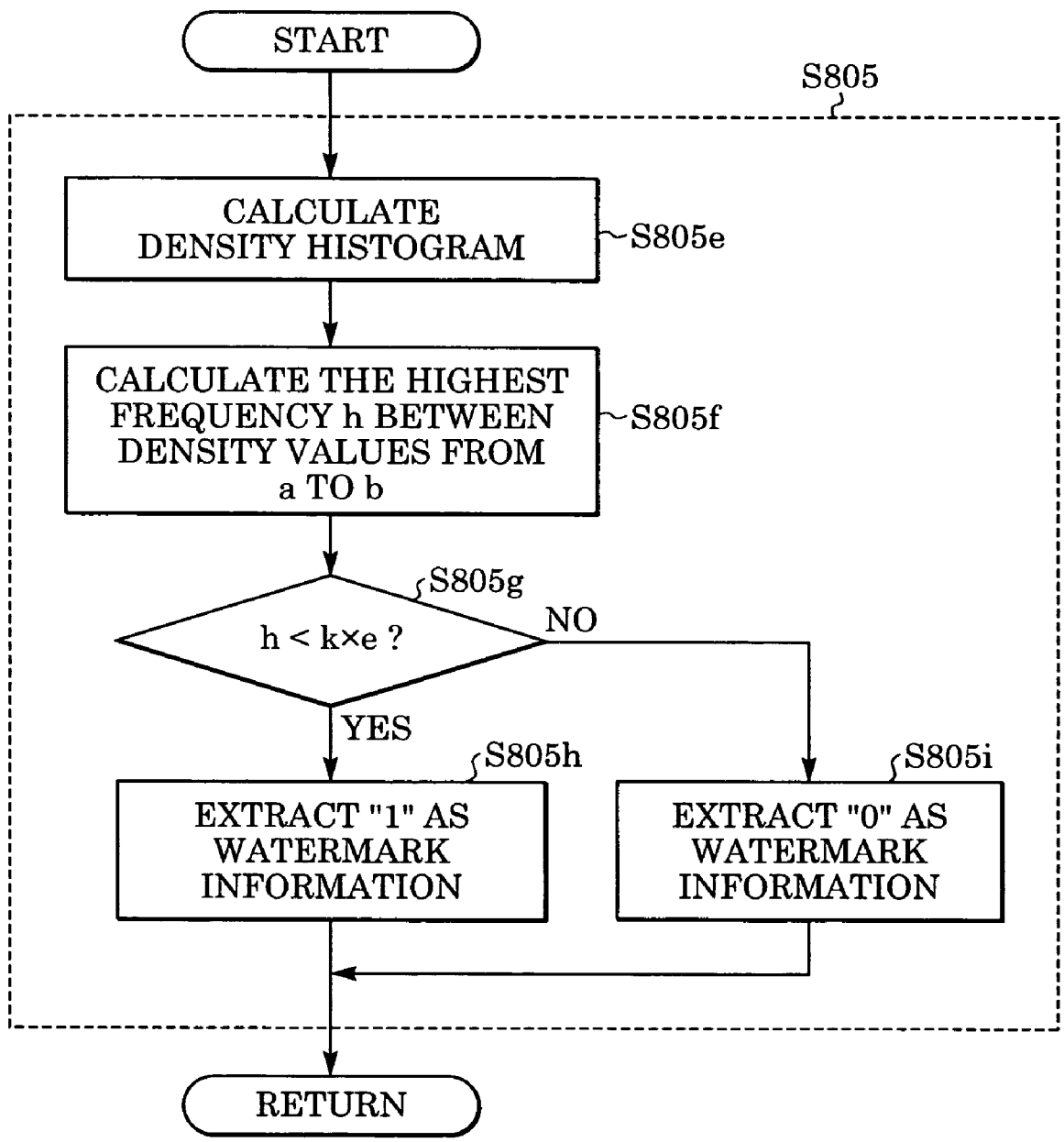
FIG. 20 is a flow chart illustrating operation procedures of extracting a digital watermark in the second embodiment.

FIG. 20 is a flow chart illustrating operation procedures of Step S805 in the second embodiment.

First, the density histogram is calculated (step S805e). Based on the density histogram, the highest frequency "h" is calculated in [a, b] (step S805f).

In step S805g, it is determined whether the calculated frequency "h" is less than "k×e." In cases where the "h" is less than "k×e" (yes in step S805g), "1" is extracted as the watermark message (step S805h). Processing then returns to FIG. 9. On the other hand, in cases where the frequency "h" is not less than "k×e" (no in step S805g), "0" is extracted as the watermark message (step S805i). Processing then returns to FIG. 9. "k" is the reference value for extracting watermark message, i.e., key message. "k" may be input by the user using a keyboard, or may be stored beforehand in the storage device. "e" is a constant and satisfies 0<e≦1.

In step 805g, the watermark message may be extracted using the following formula.

$$\sum_{i=a}^{b} h(i) < k \times e \times (b - a + 1)$$

$$\sum_{i=a}^{b} h(i)$$

becomes the value when all of the frequencies of [a, b] are added (summed).

Third Embodiment

The density value of the document image influenced by the performance of a printer or a scanner becomes light or wholly dark. Therefore, when the reference value calculated at the time of embedding is extracted, it may change. As a result, the case where correct watermark message cannot be extracted may happen.

Therefore, in the third and fourth embodiments, the watermark message is not extracted using the reference value calculated at the time of embedding, and the watermark embedding and the extracting method which cannot be easily influenced by the performance of the printer or the scanner are proposed.

In the third embodiment, the watermark message is extracted using the difference of the most frequent values of two characters without using the reference value.

Figure 21:
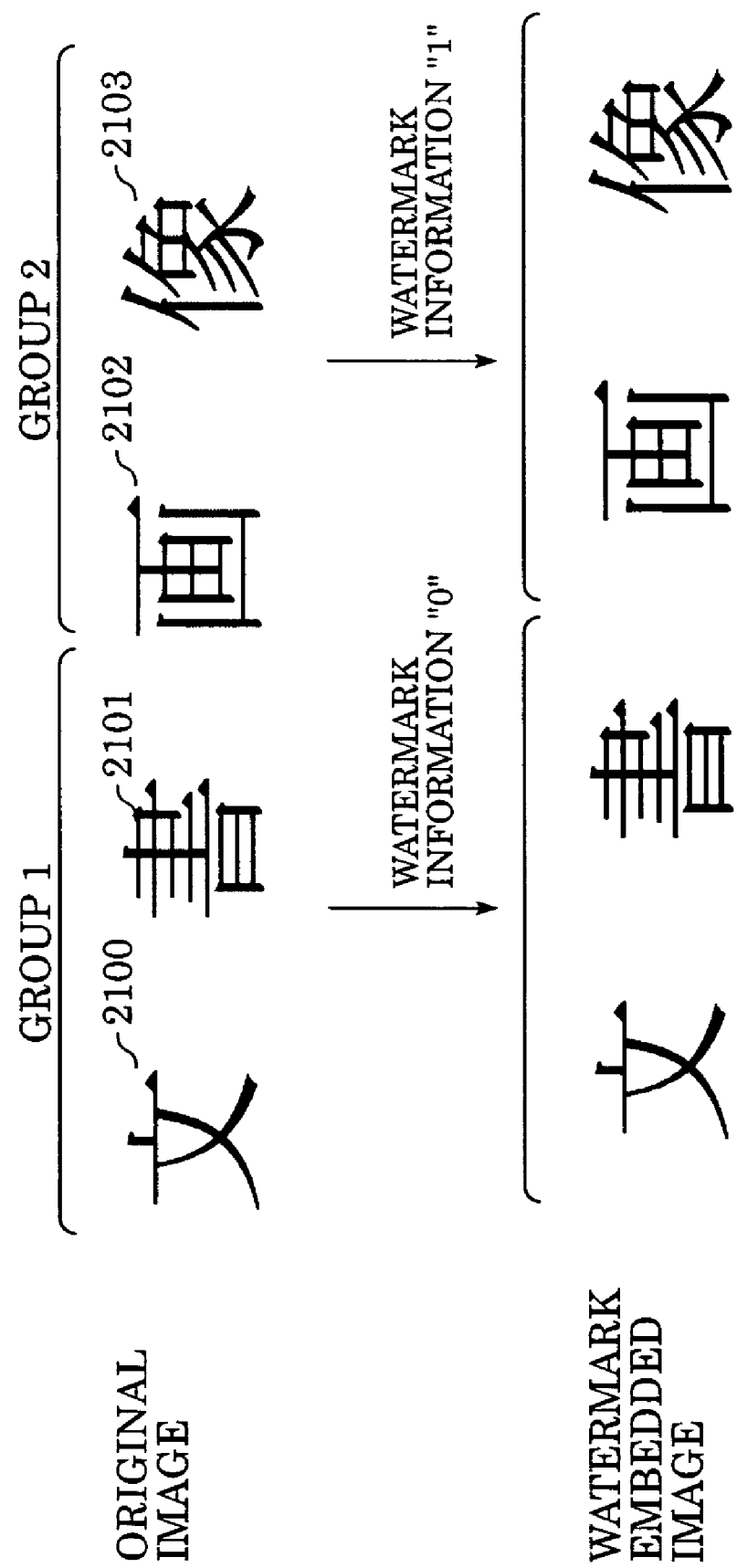
FIG. 21 is a figure illustrating characters before and after the digital watermark embedding in a third embodiment.

FIG. 21 illustrates the character before and after the digital watermark embedding in the third embodiment. In this embodiment, watermark message is embedded using two characters. That is, watermark message "0" is embedded using two characters 2100 and 2101 of group 1 of FIG. 21, and watermark message "1" is embedded using two characters 2102 and 2103 of group 2.

In cases where watermark message "0" is embedded (e.g., as in group 1), the position of the most frequent value of the density histogram of the first character 2100 is shifted to the left, and the position of the most frequent value of the density histogram of the second character 2101 is shifted to the right.

In cases where watermark message "1" is embedded (e.g., as in group 2), the position of the most frequent value of the density histogram of the first character 2102 is shifted to the right, and the position of the most frequent value of the density histogram of the second character 2103 is shifted to the left.

An arrangement and procedure for operation in the second embodiment are the same as that of the first embodiment except for steps S306 and S805.

Figure 22:
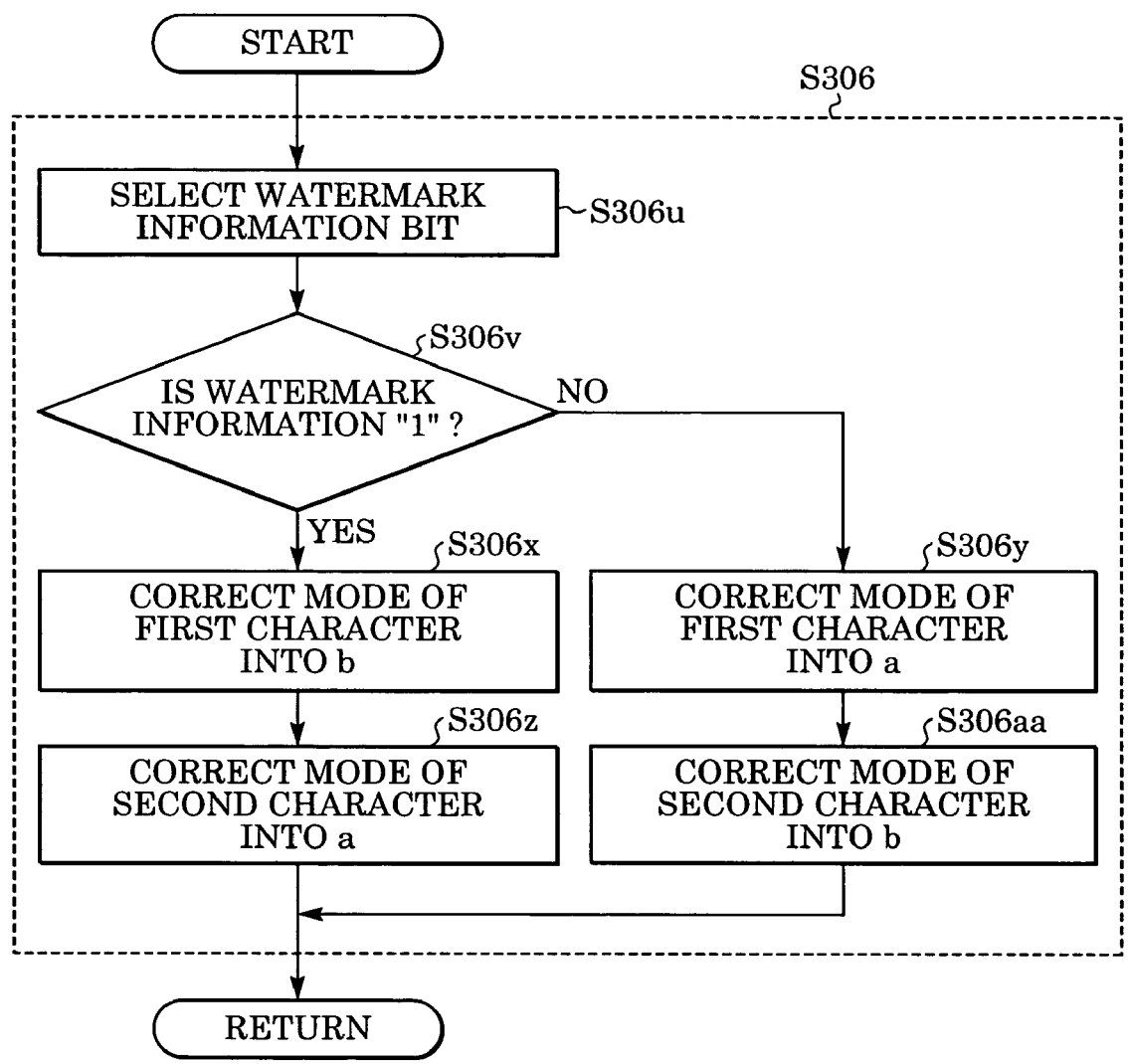
FIG. 22 is a flow chart illustrating operation procedures of embedding a digital watermark in the third embodiment.

FIG. 22 is a flow chart illustrating operation procedures of Step S306 in the third embodiment. In the third embodiment, since the watermark message is embedded by the difference of the most frequent value of two characters, the input of step S306 in this embodiment is input by two character units.

First, in step S306u, the watermark message bit to embed is selected. For example, "1" is assigned to the first character in cases where it is input as the watermark message, for example as shown (digital watermark message) in FIG. 24.

In step S306v, it is determined whether the watermark message bit to embed is "1."

If it is determined that the bit is "1" (yes in step S306v), processing proceeds to step S306x. In step S306x, all density values of the correction range of the first character are corrected to "b" so that the most frequent value may be set to "b." Next, all density values of the correction range of the second character are corrected to "a" so that the most frequent value may be set to "a" (step S306z). Even if gap of a density value occurs after a scan, the watermark message "1" can be extracted by determining the "difference (the most frequent value of the first character–the most frequent value of the second character)>0." Processing then returns to FIG. 6.

If it is determined that the bit is not "1" (no in step S306v), processing proceeds to step S306y. In step S306y, all density values of the correction range of the first character are corrected to "a" so that the most frequent value may be set to "a." Next, all the density values of the correction range of the second character are corrected to "b" so that the most frequent value may be set to "b" (step S306aa). When extracting, if difference <0 is satisfied, it will be determined that the watermark message "0" is embedded. Processing then returns to FIG. 6.

Figure 23:
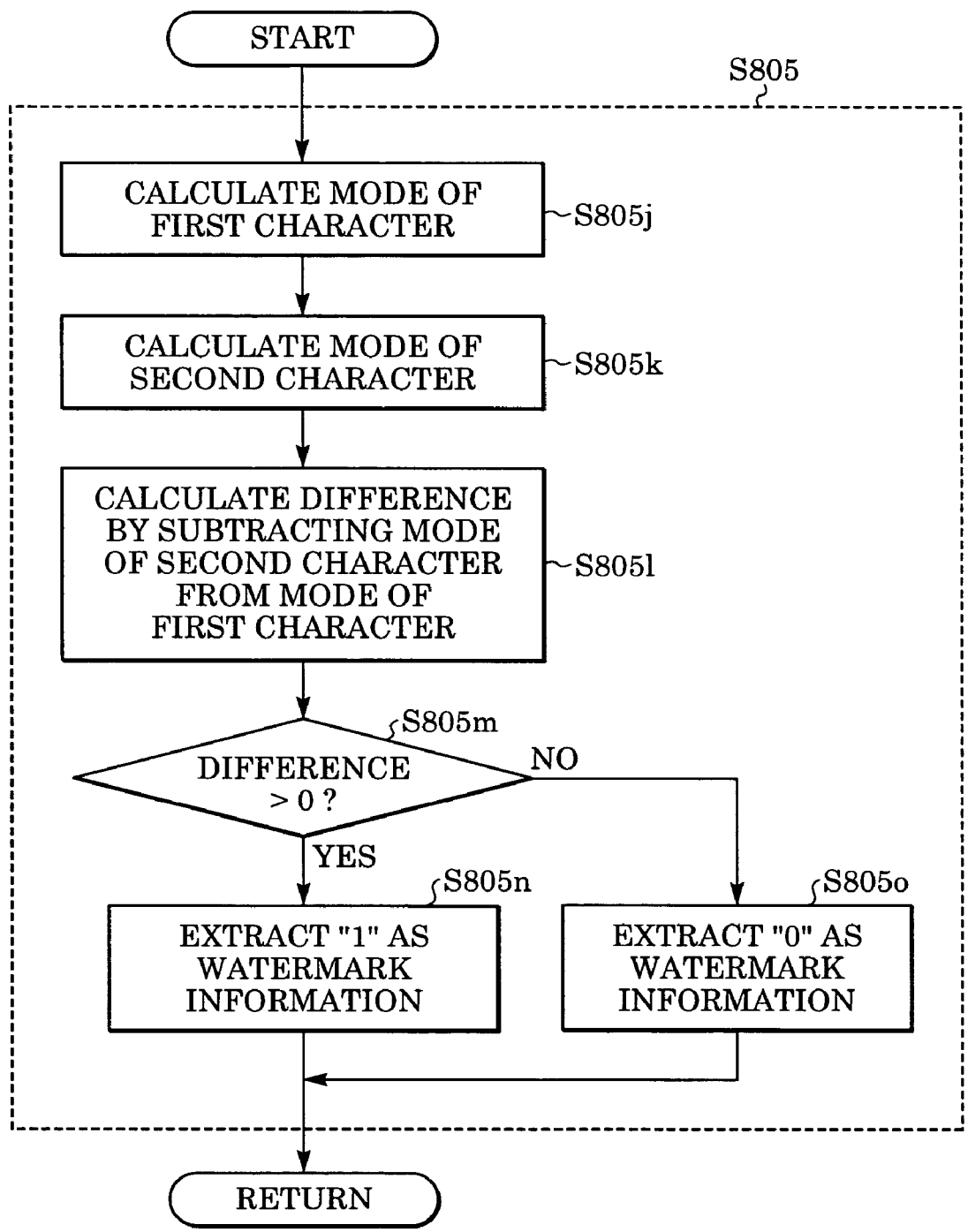
FIG. 23 is a flow chart illustrating operation procedures of extracting the digital watermark in the third embodiment.

FIG. 23 is a flow chart illustrating operation procedures of Step S805 in the third embodiment.

First, the most frequent value of the selected character rectangle is calculated (step S805$j$). The most frequent value of the next character rectangle is calculated (step S805$k$). The difference between the most frequent value of the first character rectangle and the next (second) character rectangle is calculated by subtracting the most frequent value of the second character from the most frequent value of the first character (step S8051). In step S805$m$, it is determined whether the difference calculated in step 8051 is greater than "0". In cases where the difference is greater than "0" (yes in step S805$m$), "1" is extracted as the watermark message (step S805$n$) and processing returns to FIG. 11. On the other hand, in cases where the difference is less than "0" (no in step S805$m$), "0" is extracted as the watermark message (step S805$o$) and processing returns to FIG. 11.

In this embodiment, since the watermark message is extracted without using the reference value set up by the embedding apparatus side, even if the performance of a printer or a scanner fails, the watermark message can be extracted correctly.

In the third embodiment, although one bit of message was embedded using the difference of the most frequent value of two characters, the one bit of information may also be embedded using the sum of the most frequent value of two characters. As a method of embedding the watermark message using the sum of the most frequent value of two characters, in cases where the watermark message is "1," both the most frequent value of the first character and the most frequent value of the second character are changed into "b." In cases where the watermark message is "0," both the most frequent value of the first character and the most frequent value of the second character are changed into "a." As a method of extracting the watermark message embedded by this method, the sum of the most frequent value of the first character and the most frequent value of the second character is calculated. In cases where the sum is larger than 2t, the watermark message "1" is extracted, and in cases where the sum is less than 2t, the watermark message "0" is extracted. In cases where the sum of the most frequent value of two characters is used, the reference value is used for extraction. Thus, the watermark message can be extracted more correctly than the first embodiment.

If the difference and sum are combined, the multiple-value of m bits can be embedded at two characters, and more message can be embedded.

Fourth Embodiment

In this embodiment, the watermark message is extracted using the reference value calculated by the extracting apparatus side, without using the reference value set up by the embedding apparatus side.

The arrangement and procedure required for operation when embedding the watermark message in this embodiment are the same as that of the first embodiment. For example, any one of the first embodiment, the first modification, or the second modification is sufficient for embedding the watermark of this embodiment.

However, when embedding watermark message, in step S306$a$ of the first embodiment, the digital watermark message was embedded to the selected character in order. In this embodiment, as shown in the example in FIG. 24, fixed message bits are embedded to the characters of first and second rows and the digital watermark message bit is embedded from the third row. This fixed message bit is used in order to calculate reference value "t", when extracting the watermark message.

The place which the fixed message bit embeds may not be the head of the document but behind a document, or may also be embedded at other places. Although the number of characters that embed the fixed message bit is not restricted to two rows of a document, it is desirable to embed to the character of a certain number when calculating the reference value.

The arrangement and procedure for operation at the time of the watermark message extraction in this embodiment are the same as that of the first embodiment except S805 of the first embodiment. However, since the fixed message bit other than the watermark message is embedded, it is necessary to acquire and extract the message on a place that the fixed message bit was embedded. The message may share message between the embedding apparatus and extracting apparatus side beforehand, or the message may be received independently with the document image from the embedding apparatus side.

Figure 25:
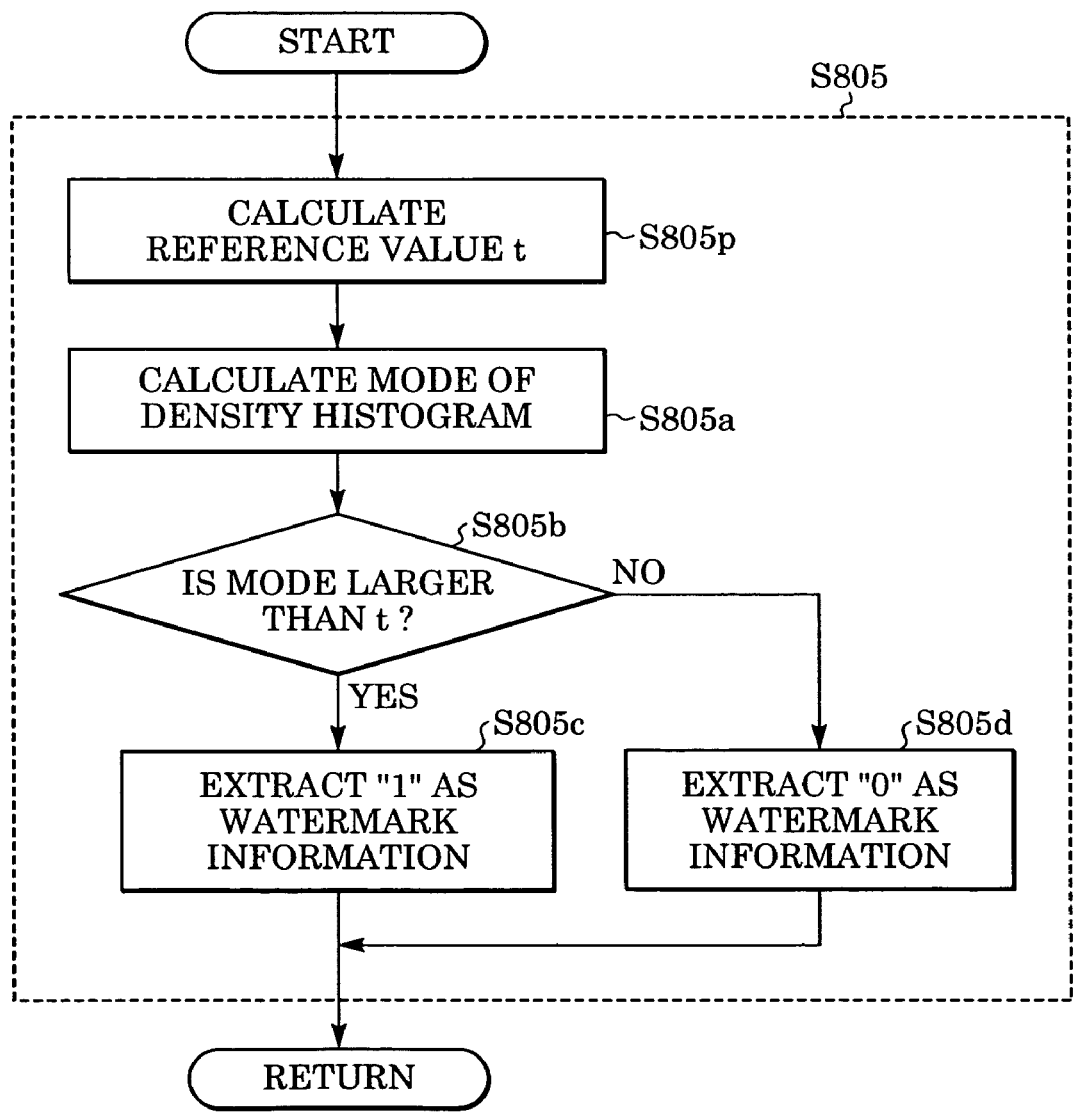
FIG. 25 is a flow chart illustrating operation procedures of extracting the digital watermark in a fourth embodiment.

FIG. 25 is a flow chart illustrating operation procedures of Step S805 in the fourth embodiment. Since the processing from step S805$a$ to step S805$d$ of FIG. 25 is the same as FIG. 12 of the first embodiment, explanation thereof is not repeated here.

Figure 26:
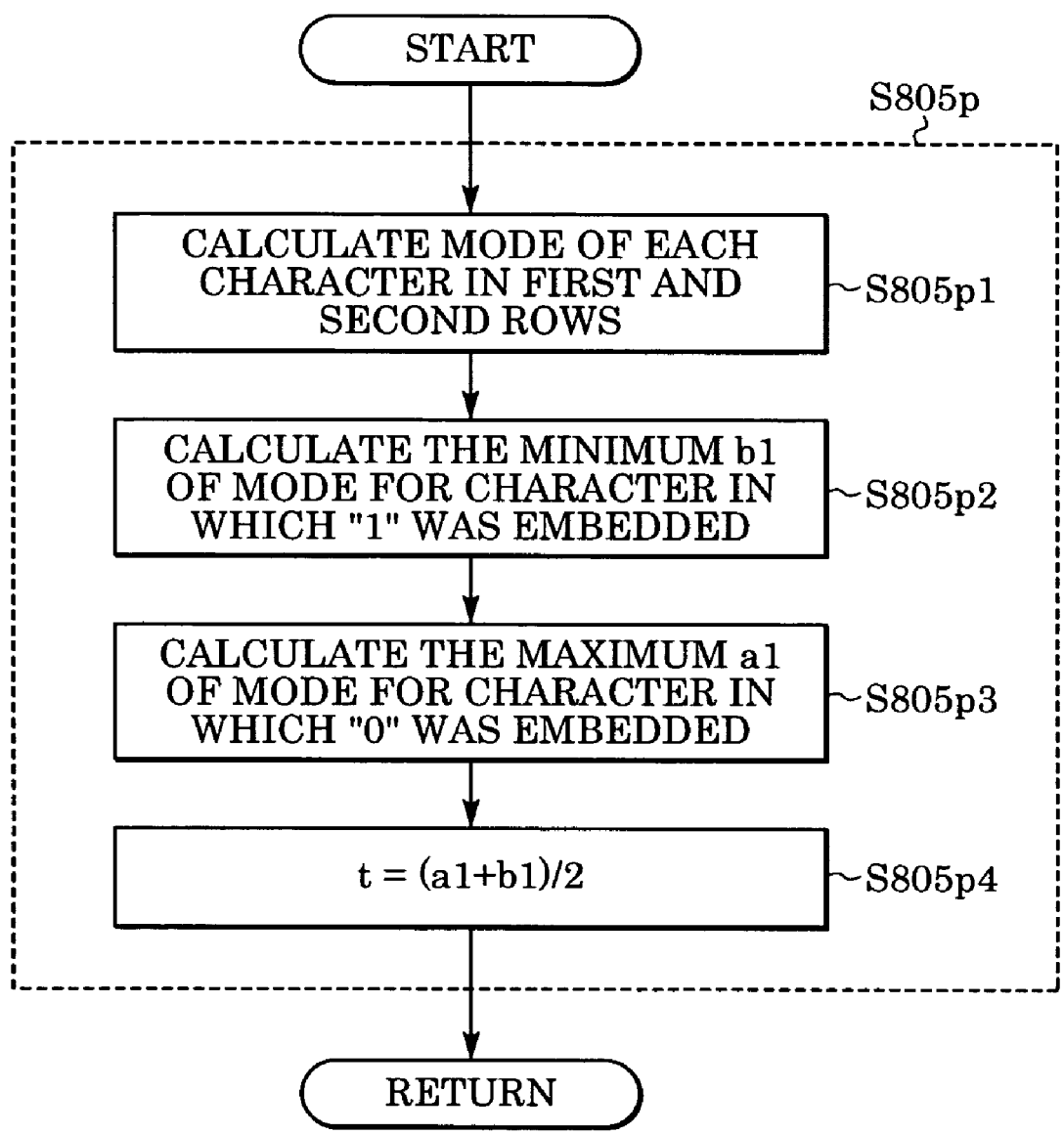
FIG. 26 is a flow chart illustrating operation procedures of calculating a reference value in the fourth embodiment.

In step S805$p$, the reference value "t" is calculated from the extracted fixed message bit. The step S805$p$ is described in further detail next with reference to FIG. 26.

First, the most frequent values of the characters are calculated based on the characters which exist in the first two rows of the document (step S805$p$1). In cases where the watermark is embedded, the fixed message bit is embedded in the first two rows. The minimum "b1" of the most frequent value of the character in which "1" was embedded is calculated (step S805$p$2). The maximum "a1" of the most frequent value of the characters in which "0" was embedded is calculated (step S805$p$3). Next, the reference value "t" is calculated using the formula of "t=(a1+b1)/2" (step S805$p$4). The "b1" and "a1" may be set up with the average of the most frequent value. Processing then returns to FIG. 25.

In this embodiment, not using the reference value calculated by the embedding apparatus side, the reference value is newly calculated by the extracting apparatus side, and the watermark message is extracted using the new reference value. Therefore, even if the performance of a printer or a scanner fails, the watermark message can be extracted correctly.

In cases where the density of the character is changed by a printing or scanning operation, the reference value calculated at the time of embedding will shift. The reference value of this embodiment is a value that corrects the influence.

Other Embodiments

Note that the present invention can be applied to an apparatus comprising a single device or to system including a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, as long as the system or apparatus has the functions of the program, the mode of implementation need not rely upon a program.

As long as the system or apparatus has the functions of the program, the program may be executed in any form, such as object code, a program executed by an interpreter, or script data supplied to an operating system.

Example of storage media that can be used for supplying the program are a floppy disk, a hard disk, an optical disk, a magneto-optical disk, a CD-ROM (compact disk-read-only memory), a CD-R (CD-recordable), a CD-RW (CD-rewritable), a magnetic tape, a non-volatile type memory card, a ROM, and a digital versatile disk (e.g., DVD-ROM, DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server may download, to multiple users, the program files that implement the functions of the present invention by computer.

It is also possible to encrypt and store the program of the present invention on a storage medium such as a CD-ROM, distribute the storage medium to users, allow users who meet certain requirements to download decryption key message from a website via the Internet, and allow these users to decrypt the encrypted program by using the key message, such that the program is installed in the user computer.

Besides the cases where the aforementioned functions according to the embodiments are implemented by executing the read program by computer and an operating system or the like running on the computer may perform all or a part of the actual processing so that the functions of the foregoing embodiments can be implemented by this processing.

After the program is read from the storage medium, it can be written to a function expansion board inserted into the computer or to a memory provided in a function expansion unit connected to the computer. A CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claim.

This application claims priority from Japanese Patent Application Nos. 2004-193482 filed Jun. 30, 2004 and 2005-127902 filed Apr. 26, 2005, which are hereby incorporated by reference herein.

What is claimed is:

1. An image processing apparatus comprising:
    an inputting unit arranged to input a watermarked document image, wherein the watermarked document includes a first area where density value of pixel data of characters has been altered in order to embed predetermined information bits, and a second area different from the first area where density value of pixel data of characters has been altered in order to embed a watermark message;
    a generating unit arranged to generate, for each character image, a density histogram indicating a frequency of a density value of pixel data of each character image in the input document image;
    a first most frequent value obtaining unit arranged to obtain, for each character image in the first area, a most frequent value in the density histogram generated by the generating unit;
    a minimum value obtaining unit arranged to obtain the minimum most frequent value obtained by the first most frequent value obtaining unit for characters in which an information bit 1 is embedded;
    a maximum value obtaining unit arranged to obtain the maximum most frequent value obtained by the first most frequent value obtaining unit for characters in which an information bit 0 is embedded;
    a reference value obtaining unit arranged to obtain a reference frequency value by averaging the minimum frequency value obtained by the minimum value obtaining unit with the maximum frequency value obtained by the maximum value obtaining unit;
    a second most frequent value obtaining unit arranged to obtain, for each character in the second area, a most frequent value in the density histogram generated by the generating unit;
    a comparing unit arranged to compare, for each character image in the second area, the reference frequency value obtained by the reference value obtaining unit and the most frequent value obtained by the second most frequent value obtaining unit; and
    an extracting unit arranged to extract a watermark message embedded in each character image in the second area based on a result of the comparison by the comparing unit.

2. An image processing apparatus according to claim 1, wherein the extracting unit is arranged to assign a first predetermined value to the watermark message when the most frequent value is larger than the reference frequency value and a second predetermined value when the most frequent value is smaller than the reference frequency value.

3. An image processing method performed by an image processing apparatus comprising:
    an inputting step of inputting a watermarked document image, wherein the watermarked document includes a first area where density value of pixel data of characters has been altered in order to embed predetermined information bits, and a second area different from the first area where density value of pixel data of characters has been altered in order to embed a watermark message;
    a generating step of generating, for each character image, a density histogram indicating a frequency of a density value of pixel data of each character image in the input document image;
    a first most frequent value obtaining step of obtaining, for each character image in the first area, a most frequent value in the density histogram generated in the generating step;
    a minimum value obtaining step of obtaining the minimum most frequent value obtained in the first most frequent value obtaining step for characters in which an information bit 1 is embedded;
    a maximum value obtaining step of obtaining the maximum most frequent value obtained in the first most frequent value obtaining step for characters in which an information bit 0 is embedded;
    a reference value obtaining step of obtaining a reference frequency value by averaging the minimum frequency value obtained in the minimum value obtaining step with the maximum frequency value obtained in the maximum value obtaining step;

a second most frequent value obtaining step of obtaining, for each character in the second area, a most frequent value in the density histogram generated in the generating step;

a comparing step of comparing, for each character image in the second area, the reference frequency value obtained in the reference value obtaining step and the most frequent value obtained in the second most frequent value obtaining step; and an extracting step of extracting a watermark message embedded in each character image in the second area based on a result of the comparison in the comparing step.

4. A computer-readable medium having stored thereon a computer program for performing the image processing method according to claim 3.

5. An image processing method according to claim 3, wherein a first predetermined value is assigned to the watermark message when the most frequent value is larger than the reference frequency value and a second predetermined value is assigned to the watermark message when the most frequent value is smaller than the reference frequency value.

6. A computer-readable medium having stored thereon a computer program for performing the image processing method according to claim 5.

* * * * *